(12) United States Patent
Leme et al.

(10) Patent No.: US 11,403,155 B2
(45) Date of Patent: Aug. 2, 2022

(54) INTEGRATION OF VEHICLE MANUFACTURER USER MANAGEMENT SYSTEM WITH AUTOMOTIVE OPERATING SYSTEM

(71) Applicant: Google LLC, Mountain View, CA (US)

(72) Inventors: Felipe Leme, Belmont, CA (US); Keun young Park, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/885,824

(22) Filed: May 28, 2020

(65) Prior Publication Data
US 2021/0294677 A1 Sep. 23, 2021

Related U.S. Application Data

(60) Provisional application No. 62/990,910, filed on Mar. 17, 2020.

(51) Int. Cl.
*G06F 9/54* (2006.01)
*G06F 21/32* (2013.01)
(Continued)

(52) U.S. Cl.
CPC ............ *G06F 9/546* (2013.01); *G06F 9/52* (2013.01); *G06F 9/541* (2013.01); *G06F 21/32* (2013.01); *B60R 16/0231* (2013.01)

(58) Field of Classification Search
None
See application file for complete search history.

(56) References Cited

U.S. PATENT DOCUMENTS

2010/0262672 A1* 10/2010 Sugiyama .......... G06Q 20/3278
709/208
2013/0297099 A1 11/2013 Rovik
(Continued)

FOREIGN PATENT DOCUMENTS

EP 3361711 A1 8/2018
JP 2008019843 A 1/2008
(Continued)

OTHER PUBLICATIONS

"Basic Software Module—Automotive Wiki," Automotive.wiki, accessed from https://web.archive.org/web/20200225042651/https://automotive.wiki/index.php/Basic_Software_Module, accessed on Nov. 24, 2020, 7 pp.
(Continued)

*Primary Examiner* — Charles E Anya
(74) *Attorney, Agent, or Firm* — Shumaker & Sieffert, P.A.

(57) ABSTRACT

Devices and methods are disclosed relating to user management services for a vehicle. One of more processors of a device may execute a first operating system to provide user management services to the vehicle. The first operating system may present an interface to a second operating system by which the second operating system may invoke user management operations. The first operating system may generate a first message relating to user management. The interface may provide the first message to the second operating system. The interface may receive a second message from the second operating system. The second message may be related to synchronizing user management between the first operating system and the second operating system.

20 Claims, 15 Drawing Sheets

(51) Int. Cl.
*G06F 9/52* (2006.01)
*B60R 16/023* (2006.01)

(56) References Cited

U.S. PATENT DOCUMENTS

| | | | | |
|---|---|---|---|---|
| 2014/0032601 | A1* | 1/2014 | Kanigicherla | G06F 16/176 707/781 |
| 2016/0205419 | A1* | 7/2016 | Ricci | H04W 4/60 725/75 |
| 2017/0075701 | A1* | 3/2017 | Ricci | H04N 21/43637 |
| 2017/0080949 | A1 | 3/2017 | Sinaguinan | |
| 2018/0312164 | A1* | 11/2018 | Sasabuchi | B60W 30/17 |
| 2018/0342107 | A1* | 11/2018 | Sisbot | G06T 19/006 |
| 2019/0116348 | A1* | 4/2019 | Liu | H04N 9/7921 |
| 2020/0218487 | A1* | 7/2020 | Rush | G09G 5/14 |
| 2020/0236427 | A1* | 7/2020 | Nagar | H04N 21/44218 |

FOREIGN PATENT DOCUMENTS

| | | |
|---|---|---|
| JP | 2010084544 A | 4/2010 |
| JP | 2015528673 A | 9/2015 |
| JP | 2019202704 A | 11/2019 |
| WO | 2014035434 A1 | 3/2014 |

OTHER PUBLICATIONS

Extended Search Report from counterpart European Application No. 20180828.4, dated Dec. 3, 2020, 10 pp.
First Office Action and Search Report, and translation thereof, from counterpart Korean Application No. 10-2020-0079252, dated May 30, 2021, 8 pp.
The Notice of Reasons for Rejection, and translation thereof, from counterpart Japanese Application No. 2020-107662, dated Oct. 12, 2021, 8 pp.
Notice of Grant from counterpart Japanese Application No. 2020-107662 dated Mar. 8, 2022, 5 pp.
Notification of Allowance of Patent from counterpart Korea, Republic of Application No. 10-2020-0079252 dated Jan. 27, 2022, 5 pp.
Response to Communication Pursuant to Rules 69 EPC dated Sep. 27, 2021, from counterpart European Application No. 20180828.4, filed Feb. 17, 2022, 13 pp.
Response to First Examination Report dated Nov. 10, 2021, from counterpart Indian Application No. 202044025280 filed Feb. 14, 2022, 16 pp.
Response to Office Action dated Oct. 12, 2021, from counterpart Japan Application No. 2020-107662 filed Jan. 4, 2022, 4 pp.
Search Report, and translation thereof, from counterpart Indian Application No. 202044025280, dated Nov. 10, 2021, 4 pp.

* cited by examiner

INTEGRATION OF VEHICLE MANUFACTURER USER MANAGEMENT SYSTEM WITH AUTOMOTIVE OPERATING SYSTEM

This application claims priority to is related to U.S. Provisional Application No. 62/990,910, filed on Mar. 17, 2020, the entire contents of which is hereby incorporated by reference.

This application references a computer program listing appendix submitted electronically as a separate file on Sep. 24, 2021, the contents of which are hereby incorporated by reference as if set forth in their entirety.

BACKGROUND

A vehicle may include a so-called "head unit" or other integrated computing device that presents an interface (such as a graphical user interface—GUI) by which to control the vehicle systems, such as a heating, ventilation, and air conditioning (HVAC) system, a lighting system (for controlling interior and/or exterior lights), an infotainment system, a seating system (for controlling a position of a driver and/or passenger seat), etc. The head unit may issue one or more commands (also referred to herein as "command sets") to the vehicle systems to change an operational state of one or more of the vehicle systems.

Different users of a vehicle, such as an automobile, motorcycle, a bus, a recreational vehicle (RV), a semi-trailer truck, a tractor or other type of farm equipment, a train, a plane, a drone, a helicopter, a personal transport vehicle, or the like, may have different preferences for settings for these vehicle systems. For example, a taller driver may prefer a seat position to be further back from the steering wheel and different mirror settings than a shorter driver of the same vehicle. Different drivers may also prefer different radio station settings, climate control settings, safety settings, drive settings, etc. As such, vehicle manufacturers (also referred to as original equipment manufacturers or OEMs) have built in user management functionality into vehicles. For example, many vehicles permit a user to save customized settings associated with that user. By interacting with an interface, such as a button, the user may quickly move the settings of the various systems from then existing settings to the user's own preferred customized settings.

Given the wide variety of vehicle systems (in terms of both functionality and operation) between not only different models from the same manufacturer, but also between models of different manufacturers, the head unit may be configured to output command sets that generally control the highest percentage of vehicle systems, as manual configuration of command sets is time consuming and expensive.

Furthermore, the manufacturers may statically code (or, in other words, "hard code") the command sets for performing each operational state change. That is, the manufacturers may statically code the command sets to conform to particular control bus protocols (some of which may be proprietary) by which the vehicle head unit may communicate with the one or more systems. The manufacturer may hard code an operating system executed by the vehicle head unit to generate command sets conforming to the control bus protocol. Each of the command sets may vary by the control bus and/or vendor of the one or more systems, etc., resulting in time consuming static coding of command sets for particular configurations of vehicles, which may even vary between vehicle model trim levels.

SUMMARY

In general, techniques of this disclosure are directed to enabling a vehicle computing device (such as a vehicle head unit) to provide user management services to a vehicle. A first operating system of the vehicle head unit may interact with a second operating system on the vehicle (which may also be of the vehicle head unit) that may control settings of various systems on the vehicle, such as ergonomic systems (e.g., seat, steering wheel, and/or pedal systems), infotainment systems, climate systems, safety systems and drive mode systems. The vehicle head unit may execute the first operating system that supports a uniform message set, while the second operating system may communicate local control messages specified in accordance with a particular control bus protocol of a plurality of control bus protocols to control the various systems of the vehicle. Rather than hard code the first operating system to support the particular local control messages to support user management services provided by the first operating system of the vehicle head unit, various aspects of the techniques of this disclosure may enable the first operating system to provide an interface, e.g., an application programming interface ("API"), to the second operating system for providing user management services. The second operating system may include a hardware abstraction layer ("HAL") for interfacing with the API.

As such, various aspects of the techniques may enable manufacturers to define a HAL that may provide translation of messages from the API into messages that are operable by the second operating system to control one or more systems of the vehicle. In this manner, the first operating system of the head unit may provide user management services to the vehicle. As only the API and the HAL may be defined, rather than hard coding translation mappings statically within the first operating system or the second operating system to support only the local command set, various aspects of the techniques may improve the speed with which vehicle head unit operating systems may be developed, improve interoperability with new or changing control bus protocols, and otherwise improve development of vehicle head unit operating systems while accommodating rapid deployment of such operating systems that provide user management services.

In one example, various aspects of the techniques are directed to a method comprising: executing, by one or more processors of a vehicle, a first operating system to provide user management services to the vehicle; presenting, by the first operating system executed by the one or more processors, an interface to a second operating system by which the second operating system invokes user management operations; generating, by the first operating system executed by the one or more processors, a first message relating to user management; providing, by the interface, the first message to the second operating system; and receiving, by the interface, a second message from the second operating system, the second message being related to synchronizing user management between the first operating system and the second operating system.

In another example, various aspects of the techniques are directed to a device configured to interact with a vehicle, the device comprising: a memory configured to store user management data; and one or more processors communicatively coupled to the memory and configured to: execute a first operating system, the first operating system presenting an interface to a second operating system to invoke user management operations; wherein the first operating system is configured to generate a first message relating to user management, the interface is configured to provide the message to the second operating system and the interface is further configured to receive a second message from the second operating system, the second message being related to synchronizing user management between the first operating system and the second operating system, and wherein the first operating system provides user management services to the vehicle based on the first message.

In another example, various aspects of the techniques are directed to a non-transitory computer-readable storage medium having stored thereon instructions that, when executed, cause one or more processors of a vehicle head unit to: execute a first operating system to provide user management services to the vehicle; present an interface of the first operating system to a second operating system by which the second operating system invokes user management operations; generate a first message relating to user management; provide, by the interface, the first message to the second operating system; and receive, by the interface, a second message from the second operating system, the second message being related to synchronizing user management between the first operating system and the second operating system.

The details of one or more examples are set forth in the accompanying drawings and the description below. Other features, objects, and advantages of the disclosure will be apparent from the description and drawings, and from the claims.

DETAILED DESCRIPTION

Figure 1:
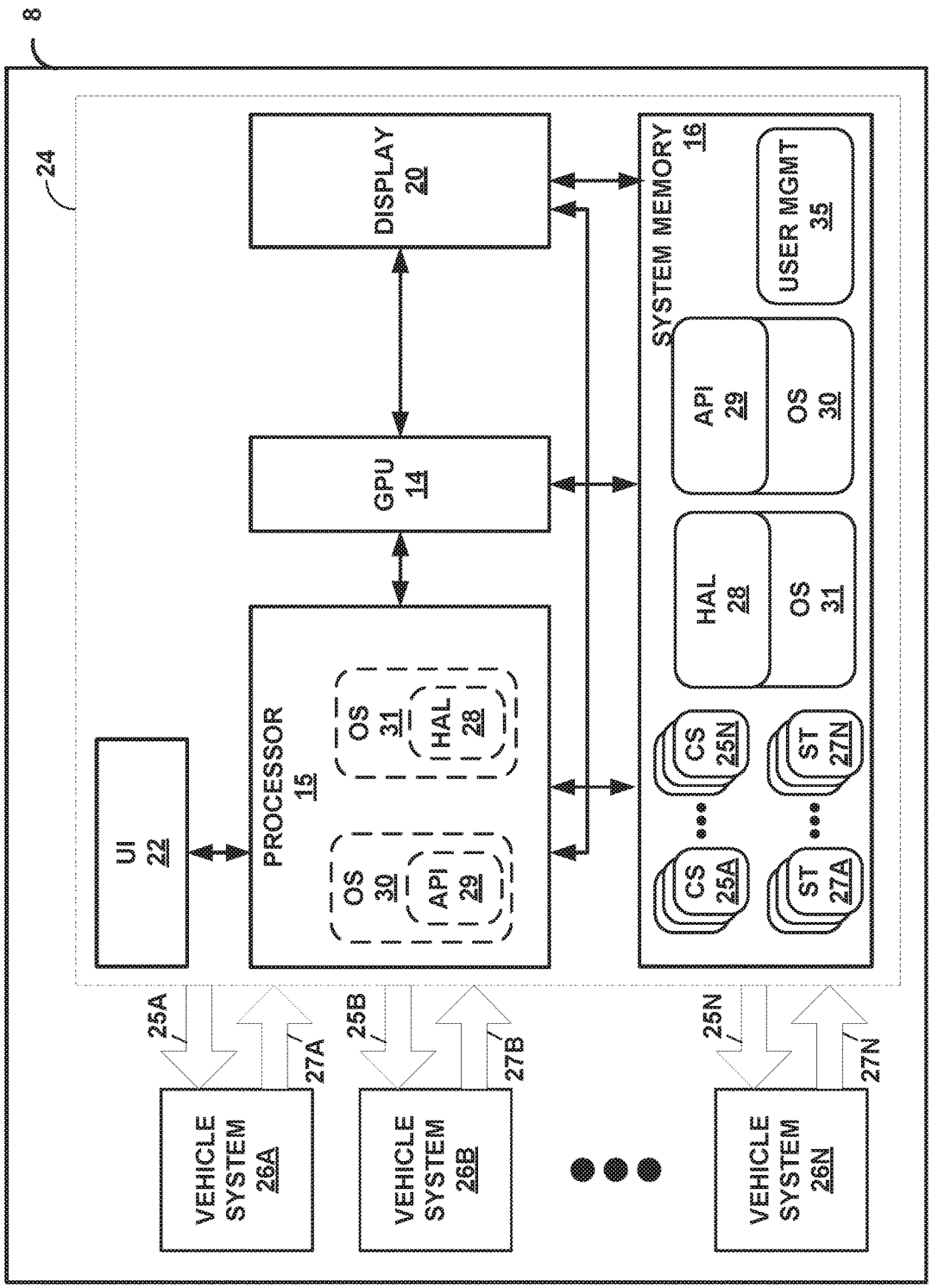
FIG. 1 is a block diagram illustrating an example vehicle configured to perform various aspects of the techniques described in this disclosure.

FIG. 1 is a block diagram illustrating an example vehicle 8 configured to perform various aspects of the techniques described in this disclosure. In the example of FIG. 1, vehicle 8 is assumed in the description below to be an automobile. However, the techniques described in this disclosure may apply to any type of vehicle capable of conveying one or more occupants between locations, such as a motorcycle, a bus, a recreational vehicle (RV), a semi-trailer truck, a tractor or other type of farm equipment, a train, a plane, a drone, a helicopter, a personal transport vehicle, and the like. In some examples, vehicle 8 may be an autonomous vehicle.

In the example of FIG. 1, vehicle 8 includes a processor 15, a graphics processing unit (GPU) 14, and system memory 16. In some examples, processor 15, GPU 14, and a transceiver module (not shown in FIG. 1) may be formed as an integrated circuit (IC). For example, the IC may be considered as a processing chip within a chip package, and may be a system-on-chip (SoC).

Examples of processor 15, and GPU 14 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 15 may represent a central processing unit (CPU) of vehicle 8. In some examples, GPU 14 may be specialized hardware that includes integrated and/or discrete logic circuitry that provides GPU 14 with massive parallel processing capabilities suitable for graphics processing. In some instances, GPU 14 may also include general purpose processing capabilities, and may be referred to as a general purpose GPU (GPGPU) when implementing general purpose processing tasks (e.g., non-graphics related tasks). Although shown as a dedicated GPU 14, GPU 14 may represent an integrated GPU that is integrated into the underlying circuit board (such as a so-called "motherboard"), or otherwise incorporated into processor 15.

Processor 15 may execute various types of applications. Examples of the applications include web browsers, e-mail applications, spreadsheets, video games, or other applications that generate viewable objects for display. System memory 16 may store instructions for execution of the one or more applications. The execution of an application by processor 15 causes processor 15 to produce graphics data for image content that is to be displayed. Processor 15 may transmit graphics data of the image content to GPU 14 for further processing based on instructions or commands that processor 15 transmits to GPU 14.

System memory 16 may also store user management data 35. User management data 35 may include user identifications for authorized users, user names, user preferred settings for operational states of one or more of vehicle systems 26 or other information pertaining to the users, such as forms of authentication associated with the users. In some examples, all or a portion of such information may be stored in user management data as user profiles. User management data 35 may be written in system memory 16 or read from system memory 16 by HAL 28 or second OS 31 and, in some examples, may together form a vehicle user management system.

Processor 15 may communicate with GPU 14 in accordance with an application programming interface (API). Moreover, the techniques described in this disclosure are not required to function in accordance with an API, and processor 15 and GPU 14 may utilize any technique for communicating with GPU 14.

System memory 16 may represent a memory for vehicle 8. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 15 to perform the functions ascribed in this disclosure to processor 15. Accordingly, system memory 16 may be a non-transitory computer-readable storage medium having instructions stored thereon that, when executed, cause one or more processors (e.g., processor 15) to perform various functions.

System memory 16 is a non-transitory storage medium. The term "non-transitory" indicates that the storage medium is not embodied in a carrier wave or a propagated signal. However, the term "non-transitory" should not be interpreted to mean that system memory 16 is non-movable or that its contents are static. As one example, system memory 16 may be removed from vehicle 8, and moved to another device. As another example, memory, substantially similar to system memory 16, may be inserted into vehicle 8. In certain examples, a non-transitory storage medium may store data that can, over time, change (e.g., in RAM).

As further shown in the example of FIG. 1, vehicle 8 may include a display 20 and a user interface 22. Display 20 may represent any type of passive reflective screen on which images can be projected, or an active reflective or emissive or transmissive display capable of displaying images (such as a light emitting diode (LED) display, an organic LED (OLED) display, liquid crystal display (LCD), or any other type of active display). Although shown as including a single display 20, vehicle 8 may include a number of displays that may be positioned throughout a cabin of vehicle 8. In some examples, passive versions of display 20 or certain types of active versions of display 20 (e.g., OLED displays) may be integrated into seats, tables, roof liners, flooring, windows (or in vehicles with no windows or few windows, walls) or other aspects of the cabin of vehicles. When display 20 represents a passive display, display 20 may also include a projector or other image projection device capable of projecting or otherwise recreating an image on passive display 20. Furthermore, display 20 may include displays integrated into driver-side dashboards that virtually represent physical instrument clusters (showing speed, revolutions per minute, engine temperature, etc.).

Display 20 may also represent displays in wired or wireless communication with vehicle 8 where vehicle 8 is autonomous. Display 20 may, for example, represent a computing device, such as a laptop computer, a heads-up display, a head-mounted display, an augmented reality computing device or display (such as "smart glasses"), a virtual reality computing device or display, a mobile phone (including a so-called "smart phone"), a tablet computer, a gaming system, or another type of computing device capable of acting as an extension of or in place of a display integrated into vehicle 8.

User interface 22 may represent any type of physical or virtual interface with which a user may interface to control various functionalities of vehicle 8. User interface 22 may include physical buttons, knobs, sliders or other physical control implements. User interface 22 may also include a virtual interface whereby an occupant of vehicle 8 interacts with virtual buttons, knobs, sliders or other virtual interface elements via, as one example, a touch-sensitive screen, or via a touchless interface. The occupant may interface with user interface 22 to control one or more of a climate within vehicle 8, audio playback by vehicle 8, video playback by vehicle 8, transmissions (such as cellphone calls) through vehicle 8, or any other operation capable of being performed by vehicle 8.

User interface 22 may also represent interfaces extended to display 20 when acting as an extension of or in place of a display integrated into vehicle 8. That is, user interface 22 may include virtual interfaces presented via a heads-up display (HUD), augmented reality computing device, virtual reality computing device or display, tablet computer, or any other of the different types of extended displays listed above.

In the context of vehicle 8, user interface 22 may further represent physical elements used for manually or semi-manually controlling vehicle 8. For example, user interface 22 may include one or more steering wheels for controlling a direction of travel of vehicle 8, one or more pedals for controlling a rate of travel of vehicle 8, one or more hand brakes, etc.

In the example of FIG. 1, processor 15, GPU 14, system memory 16, display 20, and UI 22 may collectively represent, at least in part, what is referred to as a head unit 24 (or, in other words, a "vehicle head unit 24") in the automotive context. Head unit 24 may represent any integrated or separate computing device capable of interfacing with various aspects of vehicle 8 and/or providing entertainment for occupants and/or information regarding vehicle 8 (where such head units may be referred to as "infotainment units" or "infotainment systems").

As further shown in the example of FIG. 1, vehicle 8 may include a number of different vehicle systems 26A-26N ("vehicle systems 26"). Vehicle systems 26 may include a heating, ventilation, air conditioning (HVAC) system or a temperature regulation system (e.g., which may include heated and/or cooled seats in addition to the HVAC system) (either or both of which may also be referred to as a climate system herein), a lighting system (for providing interior and/or exterior lighting), a seat control system (for adjusting a position of occupant seating), a mirror control system (for controlling interior and/or exterior mirrors, including rear-view mirrors, side mirrors, visor mirrors, etc.), a windshield wiper control system, an entertainment system (for controlling radio playback, video playback, image display, etc.), a safety assistant system (for controlling parking assistance, back-up assistance, etc.), a drive mode system (for controlling the suspension, transmission, etc.) a sun-/moon-roof control system (for controlling sunroofs and/or moonroofs), and any other type of vehicle system capable of control via a head unit, such as head unit 24. An example of vehicle systems 26 may include an electronic control unit (ECU), which may control any of the foregoing examples of vehicle systems 26.

Head unit 24 may issue one or more messages, shown in FIG. 1 as commands ("CS") 25A-25N to vehicle systems 26 to change an operational state of one or more of vehicle systems 26. Given the wide variety of vehicle systems 26 (in terms of both functionality and operation) between not only different models of vehicles from the same manufacturer, but also between models of vehicles from different manufacturers, head unit 24 may be configured to output commands 25A-25N that generally control the highest percentage of vehicle systems 26, as manual configuration of command sets is time consuming, expensive, and prone to error.

Furthermore, head unit 24 may execute the first operating system ("OS") 30 that is configured to provide user management services to vehicle 8. First OS 30 may include an interface, such as API 29, for interfacing with another operating system, such as second OS 31. Head unit 24 may further execute second OS 31 that is configured to output messages according to a control bus protocol, such as a control area network (CAN) protocol. Operating systems of head units, such as second OS 31, may be statically configured (or, in other words, "hard coded") to communicate with vehicle systems 26 via the CAN protocol or other standard (e.g., an open or proprietary) control bus protocol. That is, the manufacturer may manually program second OS 31 to enable second OS 31 to interface with each of vehicle systems 26 via the control bus (which is not shown in the example of FIG. 1 for ease of illustration purposes).

Programming the operating systems to correctly interface with each of vehicle systems 26 may be time consuming and require significant testing to ensure correct interoperability with vehicle systems 26. To illustrate, a manufacturer may source vehicle systems 26 from a wide variety of vendors, which may provide vehicle systems 26 that communicate states of vehicle properties and are controlled in accordance with a number of different control bus protocols. The manufacturer may, even within a single model, have to source vehicle systems 26 that communicate according to different control bus protocols (such as between different trim levels of the same model). The manufacturer may, as a result, create two or more different versions of the operating system, each of which are individually hard coded to communicate with vehicle systems 26 via the different control bus protocols. In addition, any changes to the control bus protocol may result in the manufacturer updating the operating system to hard code the operating system to support the newer versions of the control bus protocol, which may potentially reduce the ability of manufacturers to support new or changing control bus protocols, thereby potentially preventing vehicle 8 from receiving upgrades that improve safety, convenience and other aspects of vehicle 8.

In accordance with various aspects of the techniques described in this disclosure, an operating system (such as first OS 30) may provide an interface, such as an API, for communicating messages with another operating system (such as second OS 31) in a vehicle for providing user management services. As noted above, vehicle system busses may conform to different proprietary and open standards by which commands 25A-25N are communicated between head unit 24 (which may also be referred to as a "vehicle head unit 24") and one or more systems of the vehicle (e.g., vehicle systems 26). Vehicle head unit 24 may execute first OS 30 that supports uniform messages to provide user management services to vehicle 8 and second OS 31 that may support local control messages for communicating over vehicle system busses 26 as specified in accordance with a particular local control bus protocol of a plurality of local control bus protocols. Rather than hard code first OS 30 to support the particular local control messages, various aspects of the techniques may enable first OS 30 of vehicle head unit 24 to provide an interface, such as an API, to enable communications of messages between first OS 30 and second OS 31 to facilitate the provision of user management services by first OS 30 to vehicle 8. The local control messages may be formatted in accordance with one of a DBC format, a Kayak CAN definition (KCD) format or other format.

In operation, processor 15 may execute first OS 30 to provide user management services for vehicle 8. In some examples, processor 15 may execute first OS 30 to control one or more of vehicle systems 26, such as to change settings of the one or more vehicle systems 26 to reflect a preference of a particular user, through second OS 31. For example, first OS 30 may provide messages through an interface, such as API 29, to second OS 31.

In some examples, processor 15 may execute one or more threads of first OS 30 and one or more threads of second OS 31. In some examples, a separate processor may execute one or more threads of first OS 30 and a separate processor may execute one or more threads of second OS 31. In some examples, second OS 31 may be configured to provide a HAL 28. HAL 28 may provide what may be referred to as a software shim layer between API 29 and vehicle systems 26 (including the control bus, which is not shown in the example of FIG. 1). Processor 15 may execute one or more threads representative of second OS 31, including one or more threads associated with HAL 28. Processor 15 may retrieve first OS 30 (including API 29) or second OS 31 (including HAL 28) from system memory 16 in the form of one or more commands associated with the one or more threads of first OS 30 or second OS 31, respectively, loading the commands into local memory (e.g., a layer one (L1), a layer two (L2), and/or a layer three (L3) cache, which are not shown in the example of FIG. 1 for ease of illustration purposes) prior to execution. As such, API 29, first OS 30, HAL 28, and second OS 31 are shown as being included within processor 15 using dashed lines to indicate execution by processor 15, while shown as also being included in system memory 16 using solid lines to denote long term storage of API 29, first OS 30, HAL 28, and second OS 31. Although shown as being executed by processor 15, HAL 28 may also be implemented using dedicated circuitry or hardware logic.

In any event, HAL 28 may interface with API 29 to enable first OS 30 to interface with vehicle systems 26 through second OS 31. As such, first OS 30 may provide messages to second OS 31 relating to user management and second OS 31 may generate commands 25 that conform to a control bus protocol supported by second OS 31 to control one or more vehicle systems 26. HAL 28 may receive (or, in some instances, intercept) the messages and translate, in some examples without second OS 31 requesting such translation (and in this respect transparently from the perspective of second OS 31), the messages to obtain the local message that conforms to the local control bus.

In some examples, HAL 28 may receive a first representation of a message from API 29, which may include information relating to user management, such as a request to change an operational state of one or more of vehicle systems 26 or to initiate an operational state change of one or more of vehicle systems 26 so as to conform the operational state of the one or more of vehicle systems 26 to the preferences of a given user.

HAL 28 may rearrange or otherwise convert values of bytes within the message, thereby translating the message to obtain a local control message that conforms with the control bus protocol. The local control message may, as such, include a second representation of the message. HAL 28 may transmit, via the control bus coupled to processor 15 and vehicle systems 26, the local control message to initiate the operational state chance of one or more of vehicle systems 26.

HAL 28 may likewise receive (or in some instances transparently intercept from the perspective of second OS 31 and vehicle systems 26) local messages that include operational states 27A-27N ("operational states 27," which are shown in FIG. 1 as "ST 27A-27N") from vehicle systems 26. The local control messages may conform to the local control bus protocol. HAL 28 may translate the local control messages to obtain messages which are supported by API 29 of first OS 30. HAL 28, as noted above, may provide this translation as part of abstracting the underlying hardware (or in other words, as part of providing the shim software layer), allowing for potentially simpler development and installation of first OS 30 across a variety of different hardware platforms. HAL 28 may provide the messages to API 29, which may obtain confirmation of operational state changes requested by previously sent messages.

As noted above, HAL 28 may represent a unit configured to process messages from API 29 of first OS 30 responsive, in one example, to input received via a GUI presented by display 20 from a user to change an operational state of one or more of vehicle systems 26. HAL 28 may also process outputs from API 29 of first OS 30 that are automatically generated in response to other inputs, such as operational states 27. The outputs may refer to messages issued by first OS 30 to perform the operational state change or to request an operational state change.

In some examples, first OS 30 or second OS 31 may determine to initiate a change of an operational state of one or more of vehicle systems 26 based on a form of authentication. For example, first OS 30 or second OS 31 may associate a user with a key fob, a fingerprint, a face or a voice. In some examples, one of vehicle systems 26 may represent an authentication system. In other examples, head unit 24 may include an authentication system. The authentication system may determine an authentication factor (also referred to herein as a form of authentication), such as which key fob is being used, a fingerprint of a user, an image of the user's face or a sample of the user's voice. The authentication system may provide a message to second OS 31 that is indicative of the authentication factor.

In some examples, HAL 28 may provide a message to API 29 indicative of the authentication factor. First OS 30 may determine that a current user is not a "last active user" based on the authentication factor and provide a message through API 29 to HAL 28 to request a change in one or more of vehicle systems 26 based on the current user not being the last active user. The last active user may be the last user that was using the car (before the car's engine was turned off or the car shut down). The message may include one or more preferred settings of the one or more of vehicle systems 26 for the current user.

HAL 28 may determine which user management services may be available at a given time. For example, HAL 28 may determine that a change of user settings may not be available while the vehicle is in motion or that the vehicle must be in park for the change in user settings to be available for safety reasons. In some examples, HAL 28 may determine that certain user settings may be changed, but others not based on the state of the vehicle. For example, Hal 28 may determine that seat position relative may not change when the vehicle is moving, but climate controls may.

Figure 2:
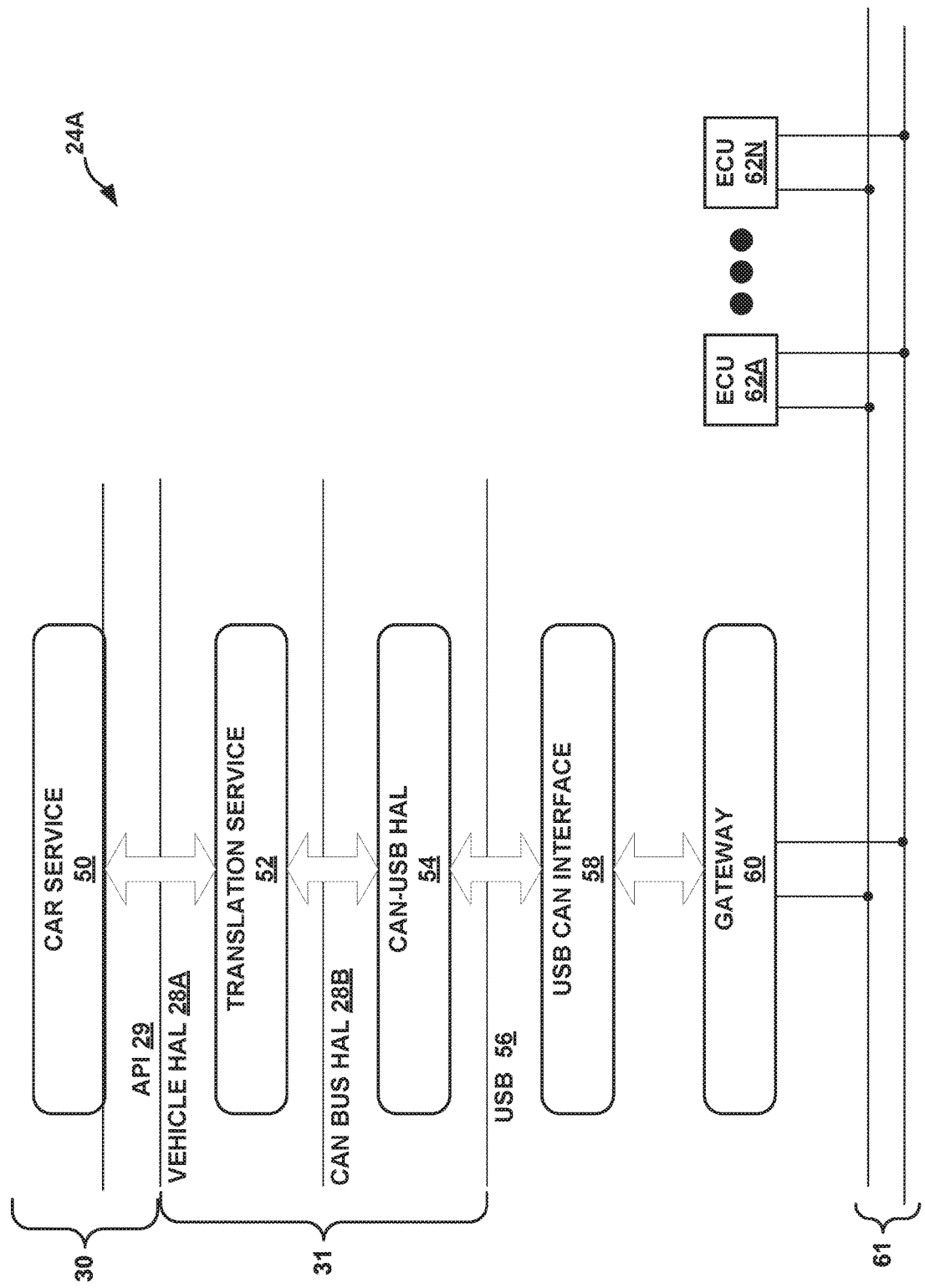
FIG. 2 is a block diagram illustrating an example of the head unit of FIG. 1 in more detail.

FIG. 2 is a block diagram illustrating an example of the head unit of FIG. 1 in more detail. Head unit 24A shown in the example of FIG. 2 is one example of head unit 24 shown in FIG. 1. Head unit 24A may execute first OS 30 (and API 29), which provides an execution environment for a car service 50, for example a user management service.

Head unit 24A may also execute two different HALs 28A and 28B. Vehicle HAL 28A may execute a translation service 52, which may perform translations between the messages from API 29 and the local control messages in accordance with various aspects of the techniques described in this disclosure. Controller area network (CAN) bus HAL 28B may represent a unit configured to convert the local control messages to universal system bus (USB) signals and USB signals to local control messages, providing yet another layer of abstraction between the hardware and first OS 30.

Head unit 24A may also include a USB 56, which is a physical USB interface along with one or more processors, fixed-logic circuitry, dedicated signal processors, a dedicated control processor (such as a dedicated control bus processor) and/or the like that expose a USB CAN interface 58 and a gateway 60. USB CAN interface 58 may represent a unit configured to provide access to CAN 61 via a USB port. Gateway 60 represents a unit configured to expose a control bus gateway by which to control access to CAN 61, and may represent a firewall or other type of device capable of limiting access to CAN 61 when certain conditions are present (e.g., dropping a malformed CAN signal, etc.). A number of electronic control units (ECUs) 62A-62N that may control vehicle electrical systems or subsystems may be communicatively coupled to CAN 61.

Figure 3:
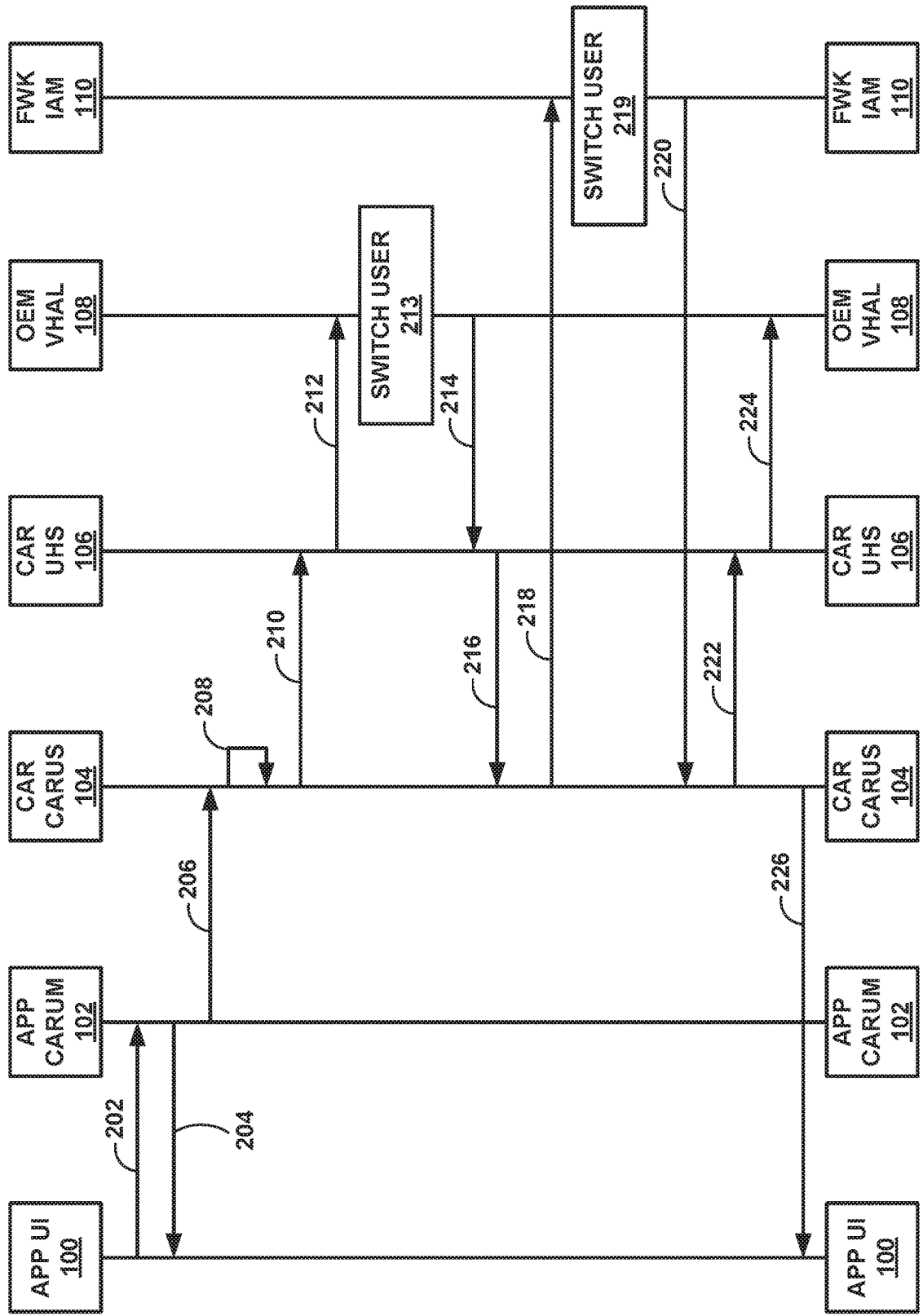
FIG. 3 is a flow diagram illustrating an example of a successful user switch according to the techniques of this disclosure.

FIG. 3 is a flow diagram illustrating an example of a successful user switch according to the techniques of this disclosure. In this example, the current user may be set to user 10 and existing users may include users 0, 10 and 11. User interface ("UI") 100 (APP UI) may send a message (e.g., SwitchToUser (11, listener)) to CarUserManager application 102 (APP CARUM) requesting to switch a user from user 10 to user 11 (202). In some examples, the message may be based on user input. In other examples, the message may be based on an authentication factor. In some examples, the message may include preferences of user 11 of settings of operational states of one or more of vehicle systems 26. UI 100 may represent an example display 20 shown in FIG. 1. CarUserManager application 102 may respond to UI 100 that the message has been received (204). CarUserManager application 102 may send a message (e.g., SwitchToUser (11, listener)) to CarUserService 104 (CAR CARUS) requesting to switch from user 10 to user 11 (206). CarUserService 104 may represent an example of first OS 30. CarUserService 104 may determine if permission to switch users has been enabled (208). If permission has been enabled, CarUserService 104 may send a message (e.g., SwitchUser (10, 11, (0, 10, 11), listener)) to UserHalService 106 (CAR UHS) requesting to switch from user 10 to user 11 (210). UserHalService 106 may represent an example of API 29 show in FIGS. 1 and 2.

UserHalService 106 may send a message (e.g., SWITCH_USER_REQUEST: 10, 11 (0, 10, 11)) to VehicleHAL 108 (OEM VHAL) requesting to switch from user 10 to user 11 (212). VehicleHAL 108 may represent an example of HAL 28 shown in FIGS. 1 and 2. VehicleHAL 108 may switch user 10 to user 11 (213) internally in VehicleHAL 108 or in second OS 31, for example. For example, VehicleHAL 108 may issue local commands to one or more of vehicle systems 26 to change one or more operational states to match preferences of user 11. VehicleHAL may provide a message (e.g., SWITCH_USER_REQUEST: OK, −1) back to UserHalService 106 indicative of a switch of users on the vehicle (214). UserHalService 106 may send a message (e.g., Result (ok)) to CarUserService 104 indicating that a change in users in first OS 30 is okay (216). CarUserService 104 may provide a message (e.g., SwitchUser (11)) to switch to user to IActivityManager 110 (which may be an example of first OS 30) (218). IActivityManager 110 may switch the user in first OS 30 to user 11 (219) and provide a message (e.g., true) back to CarUserService 104 indicating that the user has been changed to user 11 (220).

In some examples, CarUserService 104 may send a post request (e.g., postSwitchUser (ok, 10, 11, (0, 10, 11))) confirming that the switch was made from user 10 to user 11 to UserHalService 106 (222) and UserHalService 106 may send a message (e.g., SWITCH_USER_POST_REQUEST: OK, 10, 11, (0, 10, 11)) to VehicleHAL 108 confirming that the switch was made from user 10 to user 11 (224). In some examples, the post request acts like an onUserSwitch( ) callback, and is sent on ACTION LOCKED BOOT COMPLETED. CarUserService 104 may also send a message (e.g., listener.onResult(result=ok) to UI 100 indicative of the change in users being made (226). In some examples, UI 100 may provide an indication to the user that the change in users was made (not shown for simplicity purposes). For example, UI 100 may display a message, such as "Welcome back, John" or "The vehicle systems were changed to match your preferences, Mary" or the like. In some examples, UI 100 may provide an auditory indication to the users that the change was made.

Figure 4:
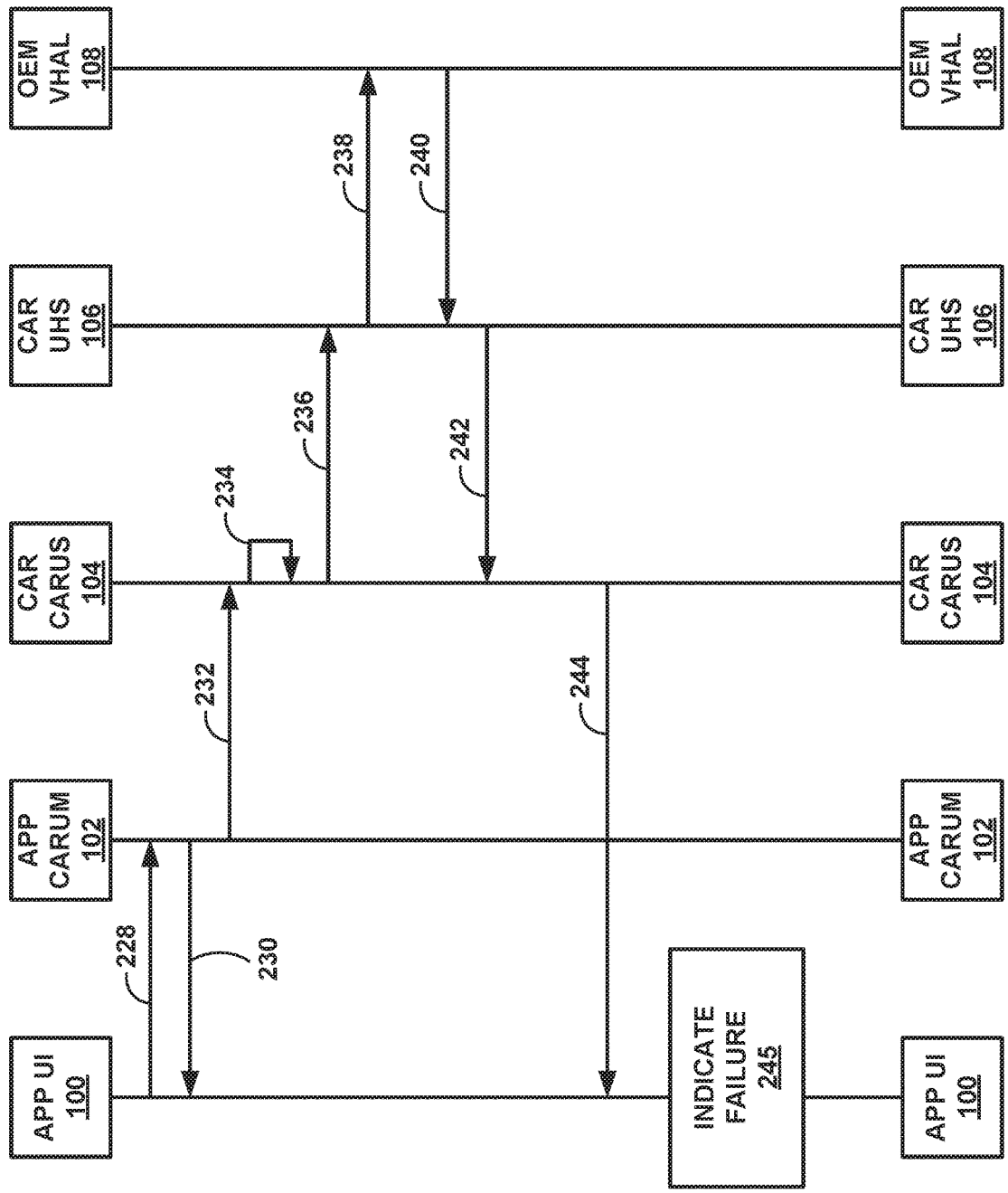
FIG. 4 is a flow diagram illustrating an example of an unsuccessful user switch according to the techniques of this disclosure.

FIG. 4 is a flow diagram illustrating an example of an unsuccessful user switch based on second OS 31 according to the techniques of this disclosure. In this example, the current user is user 10 and existing users may include users 0, 10 and 11. UI 100 may send a message (e.g., SwitchToUser (11, listener)) to CarUserManager application 102 requesting to switch a user from user 10 to user 11 (228). CarUserManager application 102 may respond to UI 100 that the message has been received (230). CarUserManager application 102 may send a message (e.g., SwitchToUser (11, listener)) to CarUserService 104 requesting to switch from user 10 to user 11 (232). CarUserService 104 may represent an example of first OS 30. CarUserService 104 may determine if permission to switch users has been enabled (234). If permission has been enabled, CarUserService 104 may send a message (e.g., SwitchUser (10, 11, (0, 10, 11), listener)) to UserHalService 106 requesting to switch from user 10 to user 11 (236). UserHalService 106 may represent an example of API 29 shown in FIGS. 1 and 2.

UserHalService 106 may send a message (e.g., SWITCH_USER_REQUEST: 10, 11 (0, 10, 11)) to VehicleHAL 108 requesting to switch from user 10 to user 11 (238). VehicleHAL 108 may represent an example of HAL 28 shown in FIGS. 1 and 2. VehicleHAL 108 may deny the request to switch user 10 to user 11 and provide a message back to UserHalService 106 indicative of a denial (e.g., SWITCH_USER_REQUEST: FAIL, 42) of the request to switch users (240). For example, VehicleHAL 108 may determine that the vehicle is moving and prevent the switch in users. UserHalService 106 may send a message (e.g., Result (FAIL, 42)) to CarUserService 104 indicating that the request to change users has been denied (242). CarUserService 104 may provide a message (e.g., listener.onResult (result=OEM_FAIL, error=42)) to UI 100 indicating that the switch in users has not occurred (244). In some examples, UI 100 may provide an indication to user 11 that the switch has not occurred (245). For example, UI 100 may display an error message or a message that a change in users is not permitted for some reason, such as the vehicle is moving, etc. In some examples, UI 100 may provide an auditory indication that the change in users did not occur.

Figure 5:
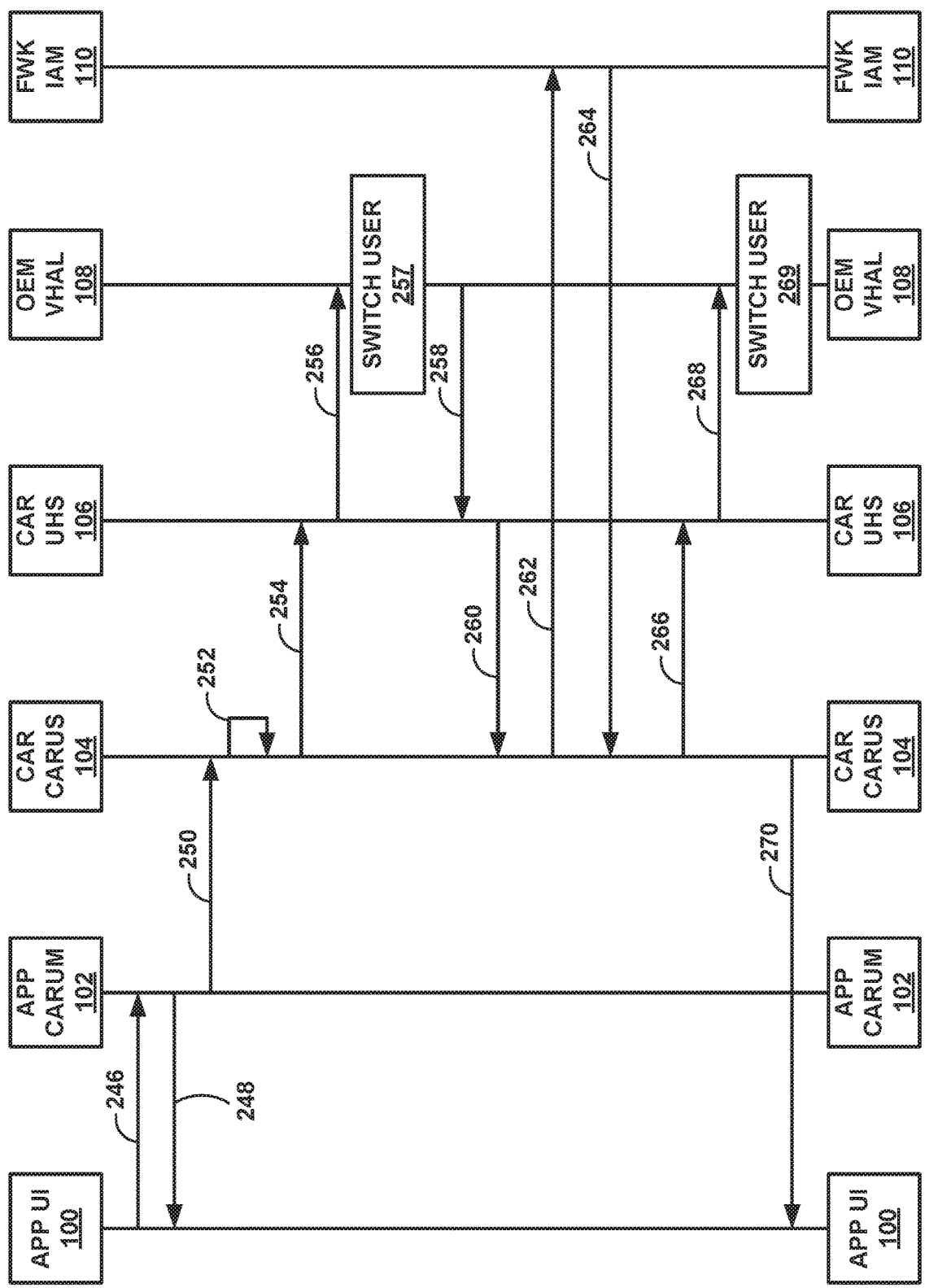
FIG. 5 is a flow diagram illustrating another example of an unsuccessful user switch according to the techniques of this disclosure.

FIG. 5 is a flow diagram illustrating an example of an unsuccessful user switch based on first OS 30 according to the techniques of this disclosure. In this example, the current user may be set to user 10 and existing users may include users 0, 10 and 11. UI 100 may send a message (e.g., SwitchToUser (11, listener)) to CarUserManager application 102 requesting to switch a user from user 10 to user 11 (246). CarUserManager application 102 may respond to UI 100 that the message has been received (248). CarUserManager application 102 may send a message (e.g., SwitchToUser (11, listener)) to CarUserService 104 requesting to switch from user 10 to user 11 (250). CarUserService 104 may represent an example of first OS 30. CarUserService 104 may determine if permission to switch users has been enabled (252). If permission has been enabled, CarUserService 104 may send a message (e.g., SwitchUser (10, 11, (0, 10, 11), listener)) to UserHalService 106 requesting to switch from user 10 to user 11 (254). UserHalService 106 may represent an example of API 29 show in FIGS. 1 and 2.

UserHalService 106 may send a message (e.g., SWITCH_USER_REQUEST: 10, 11 (0, 10, 11)) to VehicleHAL 108 requesting to switch from user 10 to user 11 (256). VehicleHAL 108 may represent an example of HAL 28 shown in FIGS. 1 and 2. VehicleHAL 108 may switch user 10 to user 11 (257) internally in VehicleHAL 108 or in second OS 31 and provide a message (e.g., SWITCH_USER_REQUEST: OK, −1) back to UserHalService 106 indicative of a switch of users on the vehicle being okay (258). UserHalService 106 may send a message (e.g., Result (ok)) to CarUserService 104 indicating that a change in users in first OS 30 is okay (260). CarUserService 104 may provide a message (e.g., SwitchUser (11)) to switch to user 11 to IActivityManager 110 (which may be an example of first OS 30) (262). IActivityManager 110 may fail to change the user in first OS 30 (not shown for simplicity purposes) and may provide a message (e.g., false) back to CarUserService 104 indicating that the user has not been changed (264). CarUserService 104 may send a post request (e.g., postSwitchUser (fail, 10, 10, (0, 10, 10))) confirming that the switch was not made from user 10 to user 11 to UserHalService 106 (266) and UserHalService 106 may send a message (e.g., SWITCH_USER_POST_REQUEST: 10, 11, (0, 10, 10)) to VehicleHAL 108 indicative of the user remaining user 10 (268). VehicleHAL 108 may change the user back to user 10 (269) internally in VehicleHAL 108 or in second OS 31. CarUserService 104 may provide a message (e.g., listener.onResult (result=ANDROID FAIL) to UI 100 indicating that the switch in users has not occurred (270). In some examples, UI 100 may provide an indication to user 11 that the switch has not occurred (not shown for simplicity purposes). For example, UI 100 may display an error message or a message that a change in users is not permitted for some reason, such as the vehicle is moving, etc. In some examples, UI 100 may provide an auditory indication that the change in users did not occur.

Figure 6:
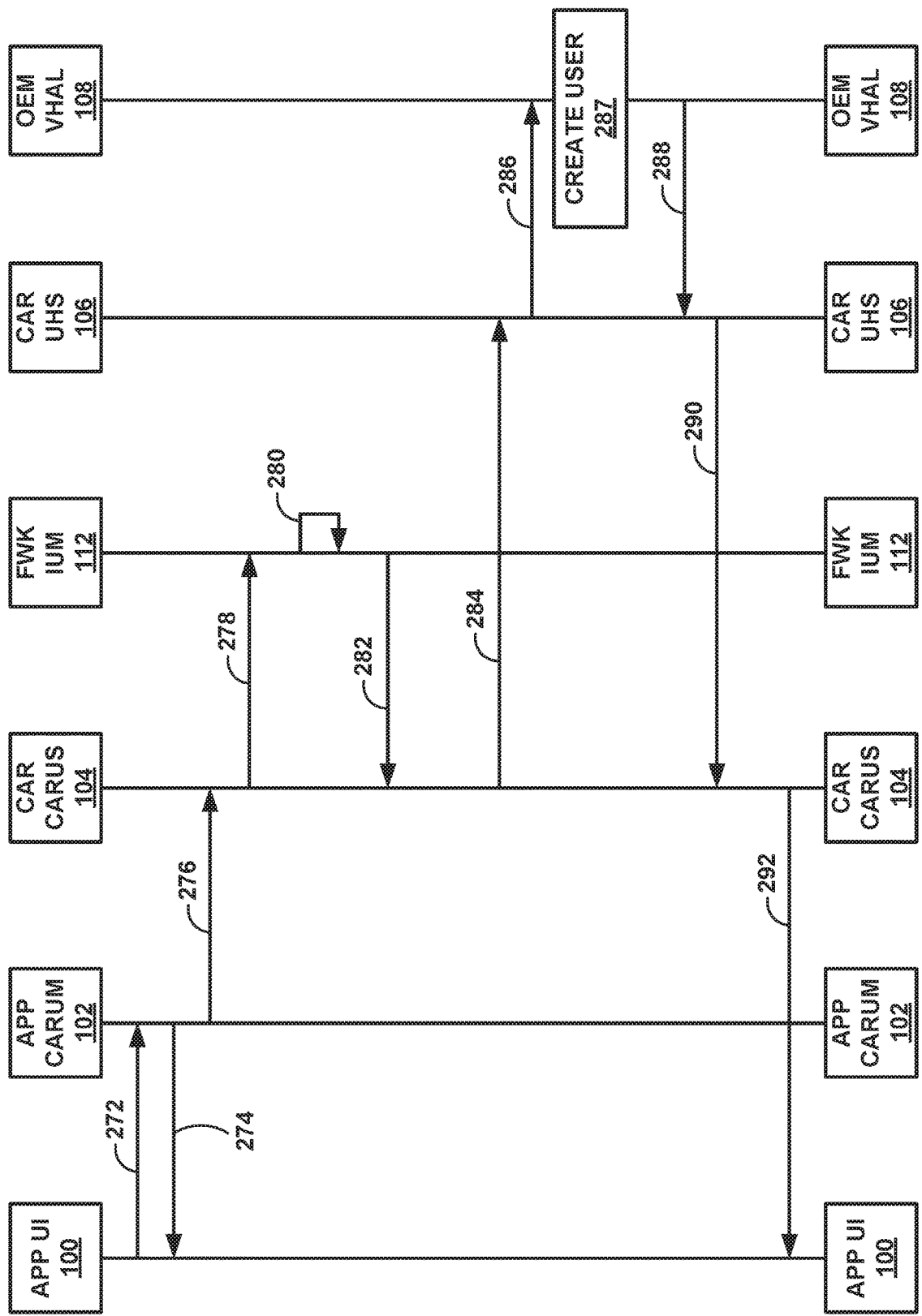
FIG. 6 is a flow diagram illustrating an example of a successful user creation according to the techniques of this disclosure.

FIG. 6 is a flow diagram illustrating an example of a successful user creation according to the techniques of this disclosure. User interface ("UI") 100 (APP UI) may send a message (e.g., CreateUser ("TheDude", userType, flags, listener)) to CarUserManager application 102 requesting to create a new user (272). The message may include a user type (such as regular user or guest user) and a user name. In some examples, a guest user may have different abilities to control vehicle systems 26 than a regular user. For example, a guest user may not be able to configure as many of vehicle systems 26 based on the guest user's profile as a regular user may be able to based on the regular user's profile. In some examples, the message may be a create initial user request. For example, when the vehicle is initially turned on (for the first time or upon the sale of the vehicle), UI 100 may seek to create an initial user. A user profile may include user preferences for settings of various of vehicle systems 26A-26N.

Additionally, the message may include preferred settings for the operational state of one or more of vehicle systems 26. UI 100 may represent an example display 20 shown in FIG. 1. CarUserManager application 102 may respond to UI 100 that the message has been received (274). CarUserManager application 102 may send a message (e.g., CreateUser ("TheDude", userType, flags, listener)) to CarUserService 104 requesting to create a new user (276). CarUserService 104 may represent an example of first OS 30. CarUserService 104 may send a message (e.g., CreateUser ("TheDude", userType, flags, listener)) to IUserManager 112 requesting to create a new user (278). IUserManager 112 may determine if permission to create users has been enabled (280). If permission has been enabled, IUserManager 112 may send a message (e.g., UserInfo (info.id-12)) to CarUserService 104 indicating that a new user may be created and that the new user identification is user 12 (282). CarUserService 104 may send a message (e.g., CreateUser (12, "TheDude", userType, flags, listener)) to UserHalService 106 requesting to create a new user 12 (284). UserHalService 106 may represent an example of API 29 show in FIGS. 1 and 2.

UserHalService 106 may send a message (e.g., CREATE_USER_REQUEST: 12, flags, "userType, TheDude") to VehicleHAL 108 to create new user 12 (286). VehicleHAL 108 may represent an example of HAL 28 shown in FIGS. 1 and 2. VehicleHAL 108 may create new user 12 in VehicleHAL 108 or second OS 31 and store new user information (e.g., user id, user name, user type, and/or preferred settings of one or more of vehicle systems 26) in user management data 35 (287). VehicleHAL 108 may provide a message (e.g., CREATE_USER_REQUEST: OK) to UserHalService 106 indicating that new user 12 has been created in user management data 35 (288). UserHalService 106 may send a message (e.g., Result (ok)) to CarUserService 104 indicating that the creation of new user 12 was successful (290). CarUserService 104 may provide a message (e.g., listener.onResult (result=ok, userId=12) to UI 100 indicating that the creation of new user 12 was successful (292). In some examples, UI 100 may provide an indication to user 12 that the creation of the new user was successful (not shown for simplicity purposes). For example, UI 100 may display a message indicating that creation of the new user was successful or UI 100 may provide an auditory indication that the creation of the new user was successful.

Figure 7:
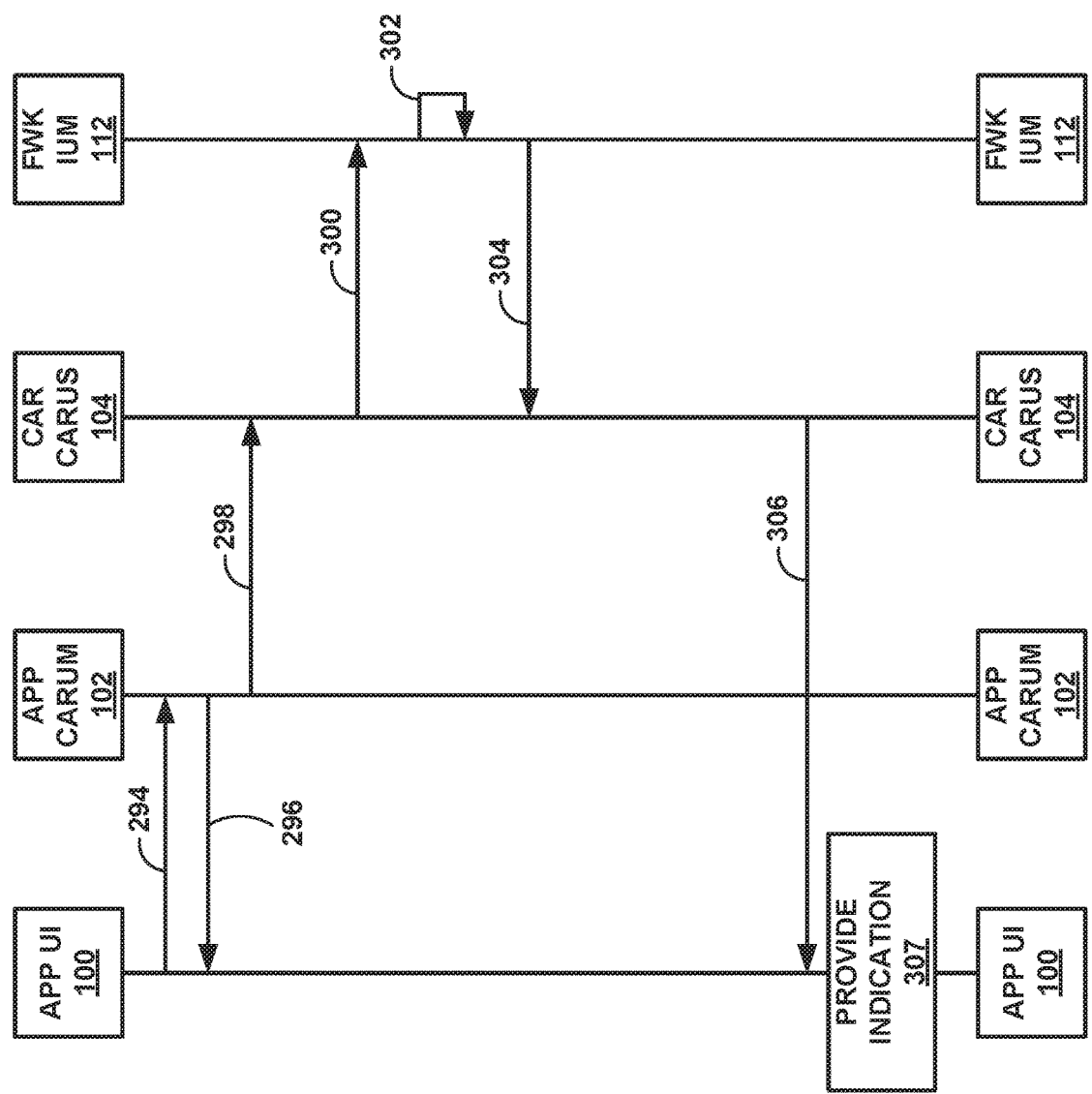
FIG. 7 is a flow diagram illustrating an example of an unsuccessful user creation according to the techniques of this disclosure.

FIG. 7 is a flow diagram illustrating an example of an unsuccessful user creation based on first OS 30 according to the techniques of this disclosure. User interface ("UI") 100 (APP UI) may send a message (e.g., CreateUser ("TheDude", userType, flags, listener)) to CarUserManager application 102 requesting to create a new user (294). UI 100 may represent an example display 20 shown in FIG. 1. CarUserManager application 102 may respond to UI 100 that the message has been received (296). CarUserManager application 102 may send a message (e.g., CreateUser ("TheDude", userType, flags, listener)) to CarUserService 104 requesting to create a new user (298). CarUserService 104 may represent an example of first OS 30. CarUserService 104 may send a message (e.g., CreateUser ("TheDude", userType, flags, listener)) to IUserManager 112 requesting to create a new user (300). IUserManager 112 may determine if permission to create users has been enabled (302). If permission has not been enabled, IUserManager 112 may send a message (e.g., null) to CarUserService 104 indicating that a new user may not be created (304). In this case, CarUserService 104 may not call VehicleHAL 108. CarUserService 104 may provide a message (e.g., listener.onResult (result=ANDROID FAIL)) to UI 100 indicating that the creation of a new user was not successful (306). UI 100 may provide an indication that the creation of the new user was not successful (307). For example, UI 100 may display a message or provide an auditory indication that creation of the new user was not successful.

Figure 8:
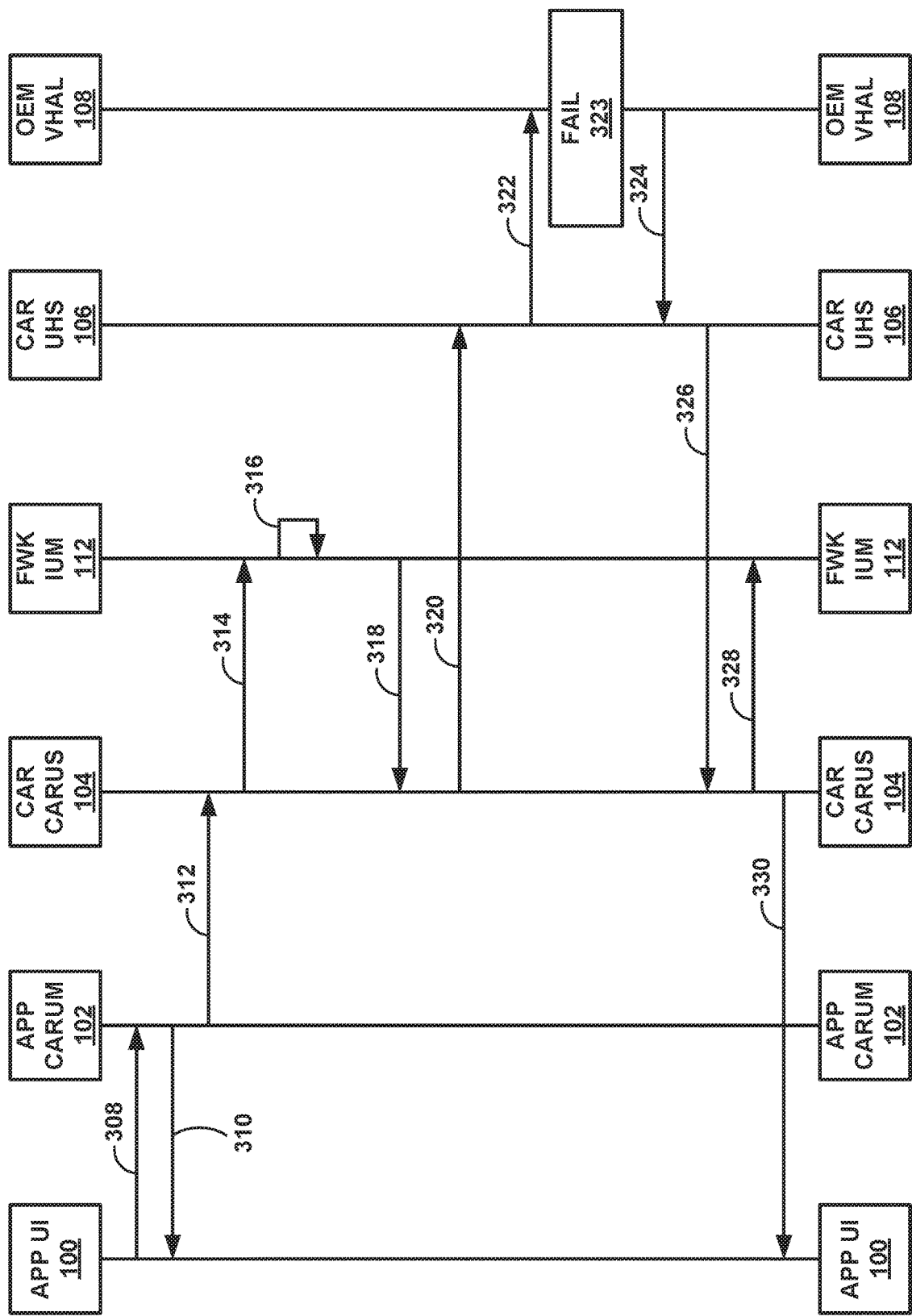
FIG. 8 is a flow diagram illustrating another example of an unsuccessful user creation according to the techniques of this disclosure.

FIG. 8 is a flow diagram illustrating an example of an unsuccessful user creation based on second OS 31 according to the techniques of this disclosure. User interface ("UI") 100 (APP UI) may send a message (e.g., CreateUser ("TheDude", userType, flags, listener)) to CarUserManager application 102 requesting to create a new user (308). UI 100 may represent an example display 20 shown in FIG. 1. CarUserManager application 102 may respond to UI 100 that the message has been received (310). CarUserManager application 102 may send a message (e.g., CreateUser ("TheDude", userType, flags, listener)) to CarUserService 104 requesting to create a new user (312). CarUserService 104 may represent an example of first OS 30. CarUserService 104 may send a message (e.g., CreateUser ("TheDude", userType, flags, listener)) to IUserManager 112 requesting to create a new user (314). IUserManager 112 may represent an example of first OS 30. IUserManager 112 may determine if permission to create users has been enabled (316). If permission has been enabled, IUserManager 112 may create a new user, e.g., user 12, in IUserManager 112 (not shown for simplicity purposes). IUserManager 112 may send a message (e.g., UserInfo (info.id=12)) to CarUserService 104 indicating that a new user may be created and that the new user identification is user 12 (318). CarUserService 104 may send a message (e.g., CreateUser (12, "TheDude", userType, flags, listener)) to UserHalService 106 requesting to create a new user 12 (320). UserHalService 106 may represent an example of API 29 show in FIGS. 1 and 2.

UserHalService 106 may send a message (e.g., CREATE_USER_REQUEST: 12, flags, "userType, TheDude") to VehicleHAL 108 to create new user 12 (322). VehicleHAL 108 may represent an example of HAL 28 shown in FIGS. 1 and 2. VehicleHAL 108 may fail to create new user 12 in user management data 35 (323). VehicleHAL 108 may provide a message (e.g., CREATE_USER_REQUEST: FAIL, 42) to UserHalService 106 indicating that new user 12 has not been created in user management data 35 (324). UserHalService 106 may send a message (e.g., Result (FAIL, 42) to CarUserService 104 indicating that the creation of new user 12 was unsuccessful (326). CarUserService 104 may provide a message (e.g., removeUser (12)) to IUserManager 112 to remove user 12 (328). IUserManager 112 may remove user 12 (not shown for simplicity purposes). CarUserService 104 may provide a message (e.g., listener.onResult (result=OEM_FAIL, error=42)) to UI 100 indicating that the creation of new user 12 was unsuccessful (330). UI 100 may provide an indication that the creation of the new user was unsuccessful (not shown for simplicity purposes).

Figure 9:
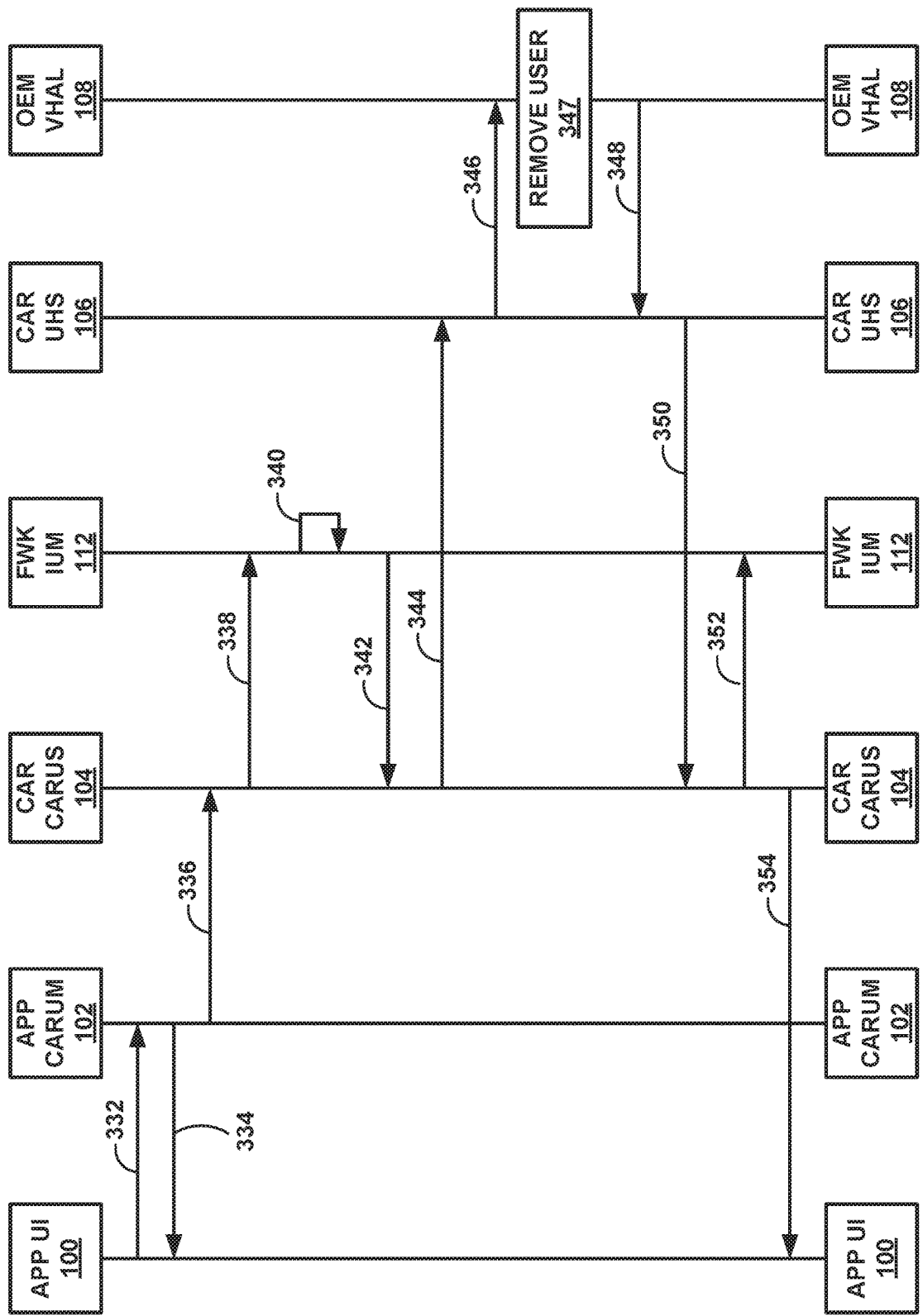
FIG. 9 is a flow diagram illustrating an example of a successful user removal according to the techniques of this disclosure.

FIG. 9 is a flow diagram illustrating an example of a successful user removal according to the techniques of this disclosure. User interface ("UI") 100 (APP UI) may send a message (e.g., removeUser (12, listener)) to CarUserManager application 102 requesting to remove user 12 (332). UI 100 may represent an example display 20 shown in FIG. 1. CarUserManager application 102 may respond to UI 100 that the message has been received (334). CarUserManager application 102 may send a message (e.g., removeUser (12)) to CarUserService 104 requesting to remove user 12 (336). CarUserService 104 may represent an example of first OS 30. CarUserService 104 may send a message (e.g., removeUser (12)) to IUserManager 112 requesting to remove user 12 (338). IUserManager 112 may represent an example of first OS 30. IUserManager 112 may determine if permission to remove users has been enabled (340). If permission has been enabled, IUserManager 112 may send a message (e.g., true) to CarUserService 104 indicating that CarUserService 104 may remove a user (342). CarUserService 104 may send a message (e.g., removeUser (12)) to UserHalService 106 requesting to remove user 12 (344). UserHalService 106 may represent an example of API 29 show in FIGS. 1 and 2.

UserHalService 106 may send a message (e.g., REMOVE_USER_REQUEST: 12) to VehicleHAL 108 to remove user 12 (346). VehicleHAL 108 may represent an example of HAL 28 shown in FIGS. 1 and 2. VehicleHAL 108 may remove user 12 from, for example, user management data 35 (347). VehicleHAL 108 may provide a message (e.g., REMOVE_USER_REQUEST: OK) to UserHalService 106 indicating that user 12 has been removed (348). UserHalService 106 may send a message (e.g., Result (ok)) to CarUserService 104 indicating that user 12 was removed (350). CarUserService 104 may send a message (e.g., removeUser (12)) to IUserManager 112 to also remove user 12 (352). IUserManager 112 may remove user 12, from, for example, memory based in a cloud (not shown for simplicity purposes). CarUserService 104 may also provide a message to UI 100 indicating that the user 12 has been removed. UI may provide an indication to a user that user 12 was removed, such as a displayed message or an auditory indication (not shown for simplicity purposes).

Figure 10:
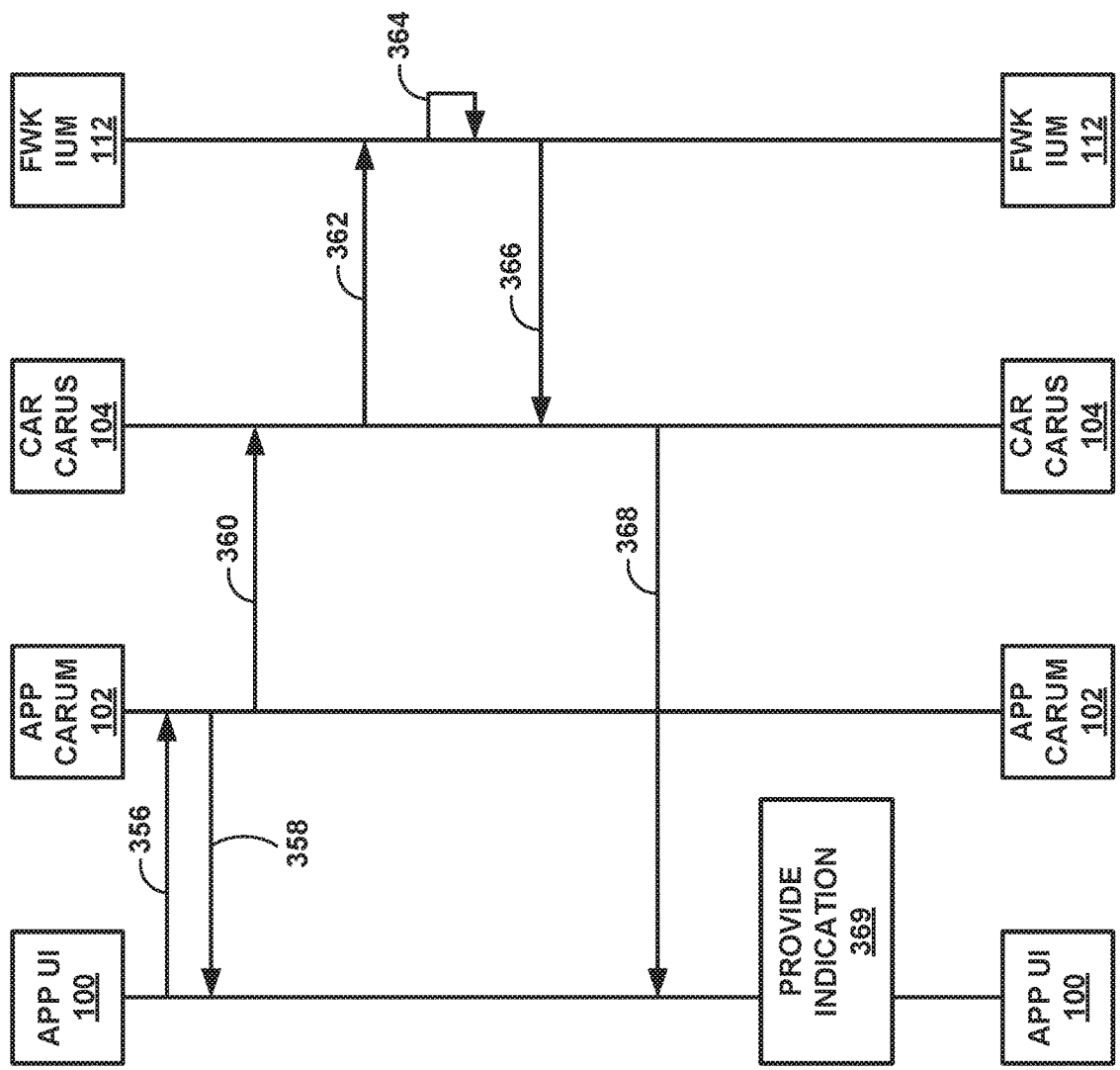
FIG. 10 is a flow diagram illustrating an example of an unsuccessful user removal according to the techniques of this disclosure.

FIG. 10 is a flow diagram illustrating an example of an unsuccessful user removal based on first OS 30 according to the techniques of this disclosure. UI 100 may send a message (e.g., removeUser (12, listener)) to CarUserManager application 102 requesting to remove a user, e.g., user 12 (356). UI 100 may represent an example display 20 shown in FIG. 1. CarUserManager application 102 may respond to UI 100 that the message has been received (358). CarUserManager application 102 may send a message (e.g., removeUser (12)) to CarUserService 104 requesting to remove user 12 (360). CarUserService 104 may represent an example of first OS 30. CarUserService 104 may send a message (e.g., removeUser (12)) to IUserManager 112 requesting to remove user 12 (362). IUserManager 112 may represent an example of first OS 30. IUserManager 112 may determine if permission to remove users has been enabled (364). If permission has not been enabled, IUserManager 112 may send a message (e.g., false) to CarUserService 104 indicating that CarUserService 104 may not remove a user (366). In this case, CarUserService 104 may not call VehicleHAL 108. CarUserService 104 may send a message (e.g., listener.onResult (result=ANDROID FAIL) to UI 100 indicating that user 12 has not been removed (368). UI 100 may provide an indication that user 12 has not been removed.

Figure 11:
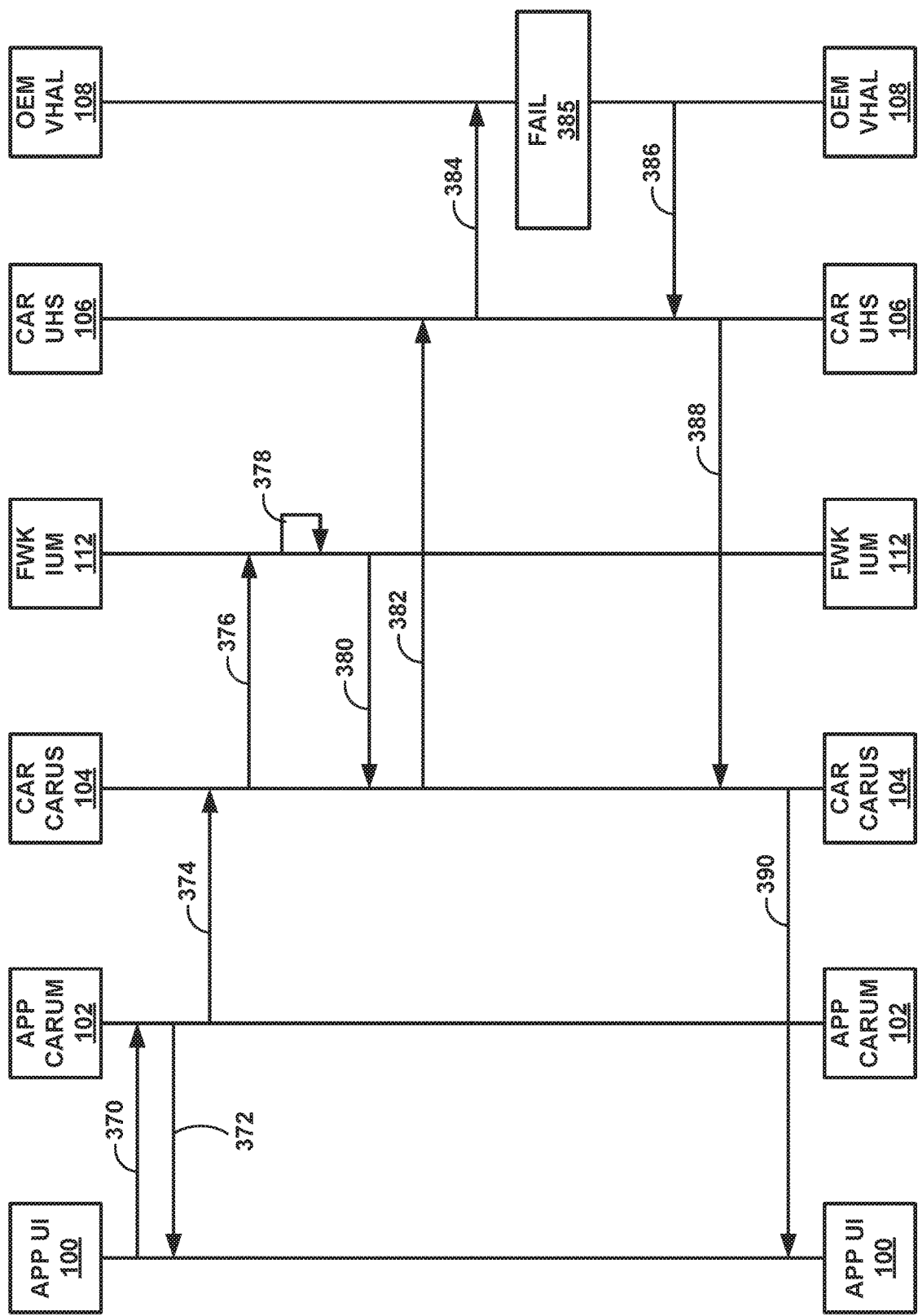
FIG. 11 is a flow diagram illustrating another example of an unsuccessful user removal according to the techniques of this disclosure.

FIG. 11 is a flow diagram illustrating an example of an unsuccessful user removal based on second OS 31 according to the techniques of this disclosure. User interface ("UI") 100 (APP UI) may send a message (e.g., removeUser (12, listener)) to CarUserManager application 102 requesting to remove user 12 (370). UI 100 may represent an example display 20 shown in FIG. 1. CarUserManager application 102 may respond to UI 100 that the message has been received (372). CarUserManager application 102 may send a message (e.g., removeUser (12)) to CarUserService 104 requesting to remove user 12 (374). CarUserService 104 may represent an example of first OS 30. CarUserService 104 may send a message (e.g., removeUser (12)) to IUserManager 112 requesting to remove user 12 (376). IUserManager 112 may represent an example of first OS 30. IUserManager 112 may determine if permission to remove users has been enabled (378). If permission has been enabled, IUserManager 112 may send a message (e.g., true) to CarUserService 104 indicating that CarUserService 104 may remove a user (380). CarUserService 104 may send a message (e.g., removeUser (12)) to UserHalService 106 requesting to remove user 12 (382). UserHalService 106 may represent an example of API 29 show in FIGS. 1 and 2.

UserHalService 106 may send a message (e.g., REMOVE_USER_REQ:12) to VehicleHAL 108 to remove user 12 (384). VehicleHAL 108 may represent an example of HAL 28 shown in FIGS. 1 and 2. VehicleHAL 108 may fail to remove user 12 from, for example, user management data 35 (385). For example, VehicleHAL 108 may determine that user 12 is a current user and not remove the current user. VehicleHAL 108 may provide a message (e.g., REMOVE_USER_REQ:FAIL, 42) to UserHalService 106 indicating that user 12 has not been removed (386). UserHalService 106 may send a message (e.g., Result (FAIL, 42)) to CarUserService 104 indicating that user 12 was not removed (388). CarUserService 104 may provide a message (e.g., listener.onResult (result=OEM_FAIL, error=42)) to UI 100 indicating that user 12 was not removed (390). UI 100 may provide an indication that user 12 was not removed (not shown for simplicity purposes). For example, UI 100 may display a message or provide an auditory indication that user 12 was not removed.

Figure 12:
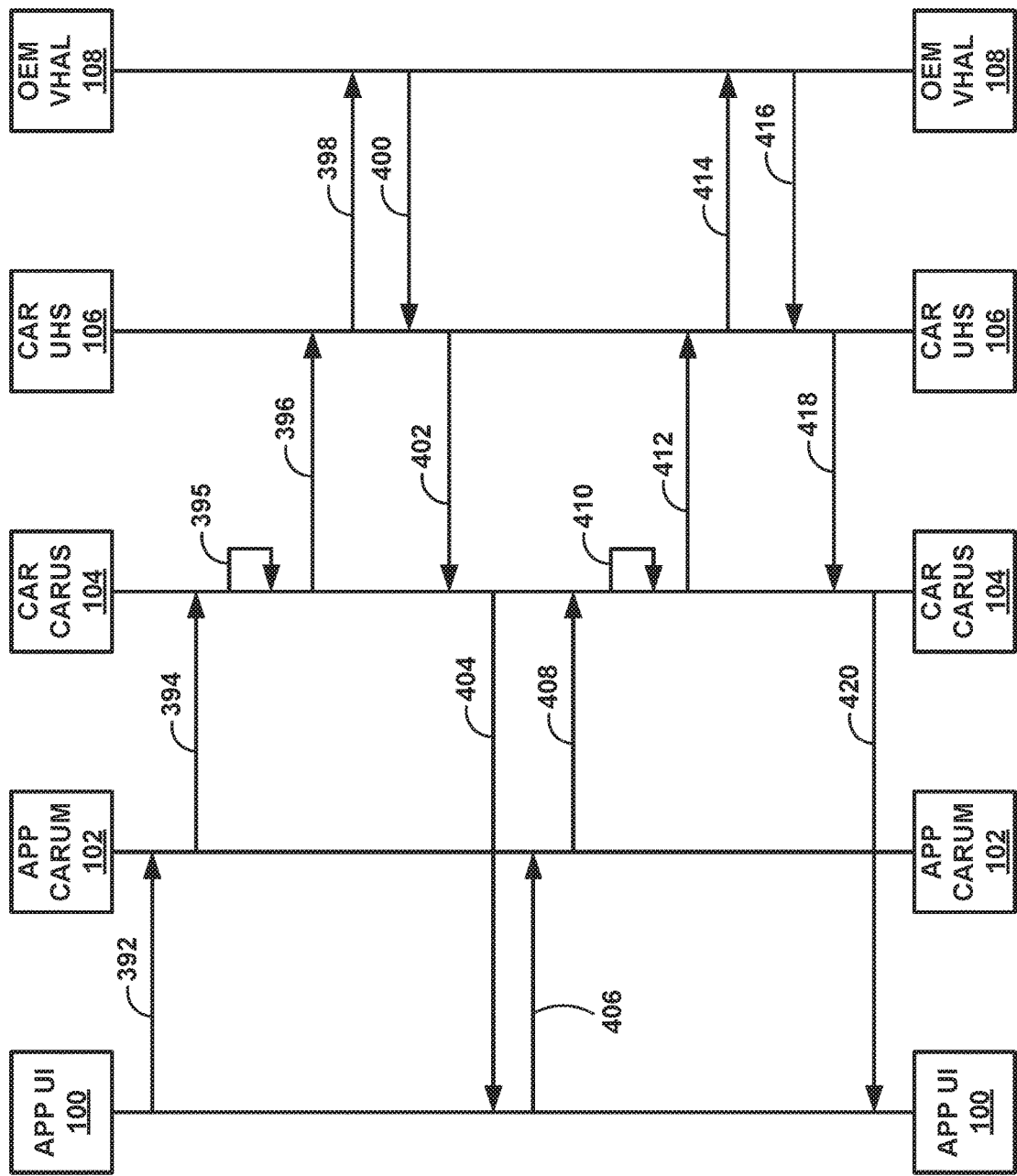
FIG. 12 is a flow diagram illustrating an example of association of a user with an authentication factor according to the techniques of this disclosure.

Modern vehicles have a plurality of ways in which the vehicle may associate a human driver with a user in a computer, such as through a key fob, a facial image, a fingerprint or a voice sample. API 29 may be configured to provide for checking and setting authentication methods. In some examples, it may provide predefined values for authentication (such as key fob, facial authentication, Bluetooth connection, etc.). A vehicle manufacturer may be able to customize the authentication. FIG. 12 is a flow diagram illustrating an example of association of a user with an authentication factor according to the techniques of this disclosure. While the example of FIG. 12 discusses a key fob as an authentication factor, any authentication factor may be used, such as a fingerprint, facial image, voice sample, etc. User interface ("UI") 100 (APP UI) may send a message (e.g., getUserIdentification ((KEY_FOB)) to CarUserManager application 102 requesting a user identification associated with the key fob the user is using (392). UI 100 may represent an example display 20 shown in FIG. 1. CarUserManager application 102 may send a message (e.g., getUserIdentification ((KEY_FOB)) to CarUserService 104 requesting a user identification associated with the key fob (394). CarUserService 104 may represent an example of first OS 30. CarUserService 104 may determine if permission to provide user identification has been enabled (395). If permission has been enabled, CarUserService 104 may send a message (e.g., getUserIdentification ((KEY_FOB)) to UserHalService 106 requesting a user identification associated with the key fob (396). UserHalService 106 may represent an example of API 29 show in FIGS. 1 and 2.

UserHalService 106 may send a message (e.g., get USER_IDENTIFICATION_ASSOCIATION (10, (KEY_FOB)) to VehicleHAL 108 requesting a user identification associated with the key fob (398). VehicleHAL 108 may represent an example of HAL 28 shown in FIGS. 1 and 2. VehicleHAL 108 may determine whether the key fob is associated with a user identification (not shown for simplicity purposes).

If the key fob is associated with a user identification, VehicleHAL 108 may provide the user identification to UserHalService 106 (not shown for simplicity purposes) which may provide the user identification to CarUserService 104 (not shown for simplicity purposes) which may provide the user identification to UI 100 (not shown for simplicity purposes). If the user identification is different from a last active user, UI 100 may attempt to switch users (not shown for simplicity purposes), as in FIGS. 3-5.

On the other hand, if the key fob is not associated with a user identification, VehicleHAL 108 may provide a message (e.g., USER_IDENTIFICATION_ASSOCIATION (NOT_ASSOCIATED_ANY_USER)) to UserHalService 106 indicative of the key fob not being associated with a user identification (400). UserHalService 106 may send a message (e.g., (NOT_ASSOCIATED_ANY_USER)) to CarUserService 104 indicating that the key fob is not associated with a user identification (402). CarUserService 104 may provide a message (e.g., (NOT_ASSOCIATED_ANY_USER)) to UI 100 indicating that the key fob is not associated with a user identification (404). UI 100 may send a message to CarUserManager 102 requesting the key fob be associated with a current user (406). CarUserManager 102 may send a message (e.g., setUserIdentification ((KEY_FOB))) to CarUserService 104 requesting the key fob be associated with the current user (408). CarUserService 104 may determine if permission to associate a key fob with the current user has been enabled (410). If permission has been enabled, CarUserService 104 may send a message (e.g., setUserIdentification ((KEY_FOB))) to UserHalService 106 requesting the key fob be associated with the current user (412).

UserHalService 106 may send a message (e.g., set_USER_IDENTIFICATION_ASSOCIATION (10, KEY_FOB)) to VehicleHAL 108 instructing VehicleHAL 108 to associate user 10 (the identification of the current user) with the key fob (414). VehicleHAL 108 may associate the current user with the key fob (not shown for simplicity purposes) and send a message (e.g., USER_IDENTIFICATION_ASSOCIATION (ASSOCIATE_CURRENT_USER) to UserHalService 106 indicating that the current user is now associated with the key fob (416). UserHalService 106 may send a message (e.g., ASSOCIATE_CURRENT_USER) to CarUserService 104 indicating that the current user is now associated with the key fob (418). CarUserService 104 may send a message (e.g., ASSOCIATE_CURRENT_USER) back to UI 100 indicating that the current user is now associated with the key fob (420). UI 100 may provide an indication, e.g., a displayed message or auditory indication, to the current user that they are now associated with the key fob (not shown for simplicity purposes).

Figure 13:
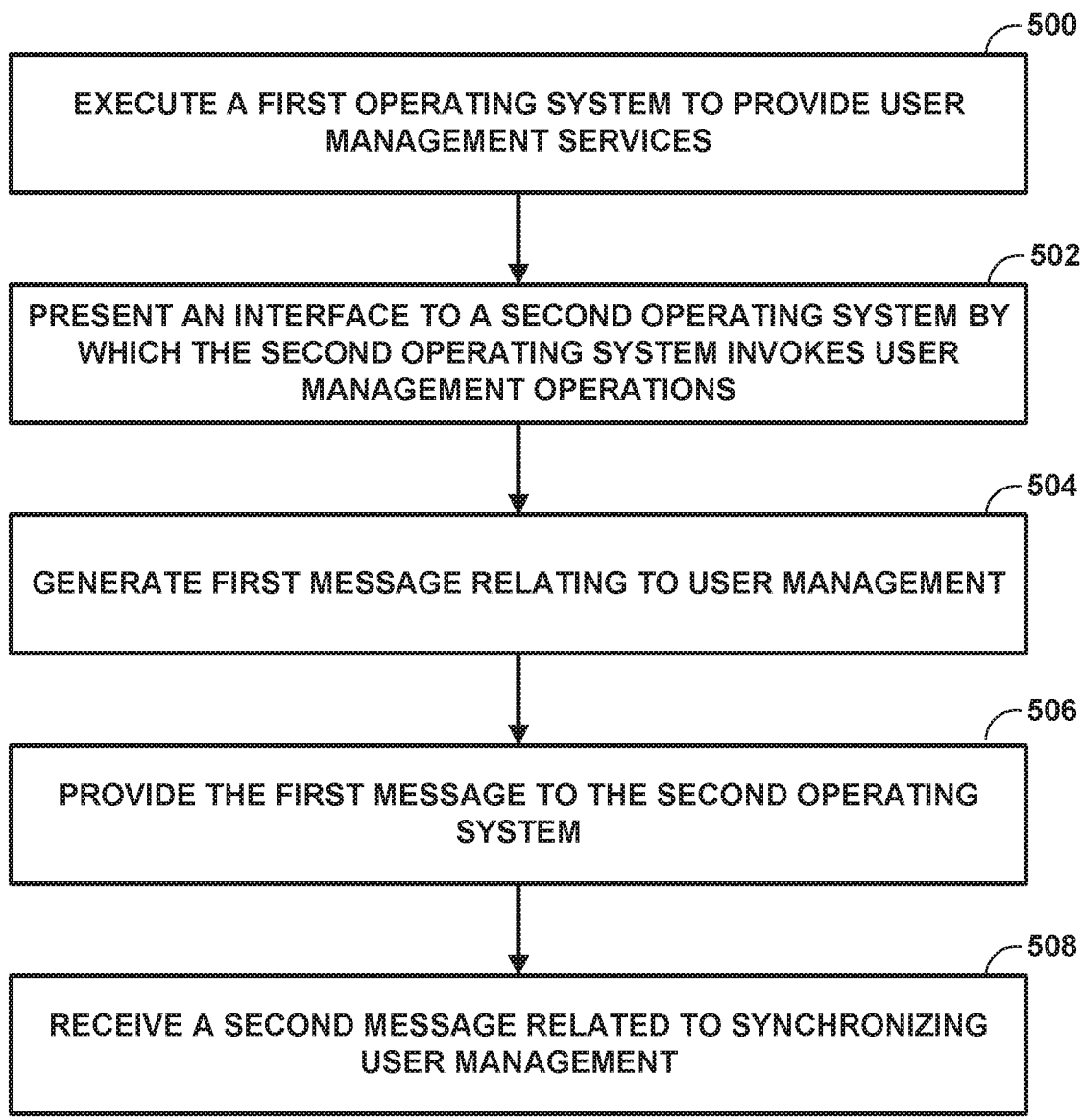
FIG. 13 is a flowchart of an example of providing user management services according to techniques of this disclosure.

FIG. 13 is a flowchart of an example of providing user management services according to techniques of this disclosure. One or more processors of a vehicle (e.g., processor 15) may execute a first operating system (e.g., first OS 30) to provide user management services to the vehicle (500). For example, processor 15 may load first OS 30 from system memory 16 and execute first OS 30. First OS 30 may provide user management services to the vehicle as discussed in this disclosure.

The first operating system may present an interface to a second operating system by which the second operating system invokes user management operations (502). For example, First OS 30 may present API 29 to second OS 31. Second OS 31 may invoke user management operations as described in the disclosure using API 29.

The first operating system may generate a first message relating to user management (504). For example, first OS 30 may generate a first message relating to user management which may include at least one of a request to change users, a user create message, a user delete message, an initial user assignment message or a guest user message. In some examples, the first message may further include a new user profile (which in some cases may be a guest user profile) or an initial user profile.

The interface may provide the first message to the second operating system (506). For example, API 29 may provide the first message to second OS 31. In some examples, API 29 may provide the first message to HAL 28 of second OS 31.

The interface may receive a second message from the second operating system, the second message being related to synchronizing user management between the first operating system and the second operating system (508). For example, API 29 may receive a second message from second OS 31. In some examples, API 29 may receive the second message from HAL 28 of second OS 31. In some examples, the second message is indicative of at least one of whether a change in users is permitted at a time; an internal user profile being stored by the second operating system in a vehicle user management system, the internal user profile being based on a new user profile within the first message; whether a user is deleted from a vehicle user management system; or whether a current user is a guest user.

In some examples, the interface may receive a third message from the second operating system. For example, API 29 may receive a third message from OS 31 (e.g., from HAL 28) which may be indicative of no user being stored in a vehicle management system (e.g., in user management 35).

Figure 14A:
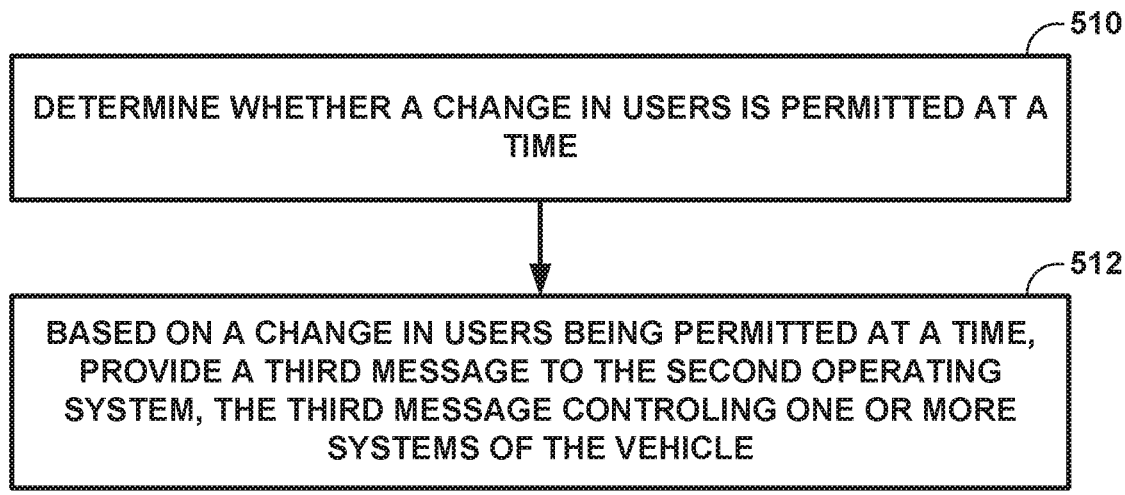
FIGS. 14A-C are flowcharts of further examples of providing user management services according to the techniques of this disclosure.
Figure 14B:
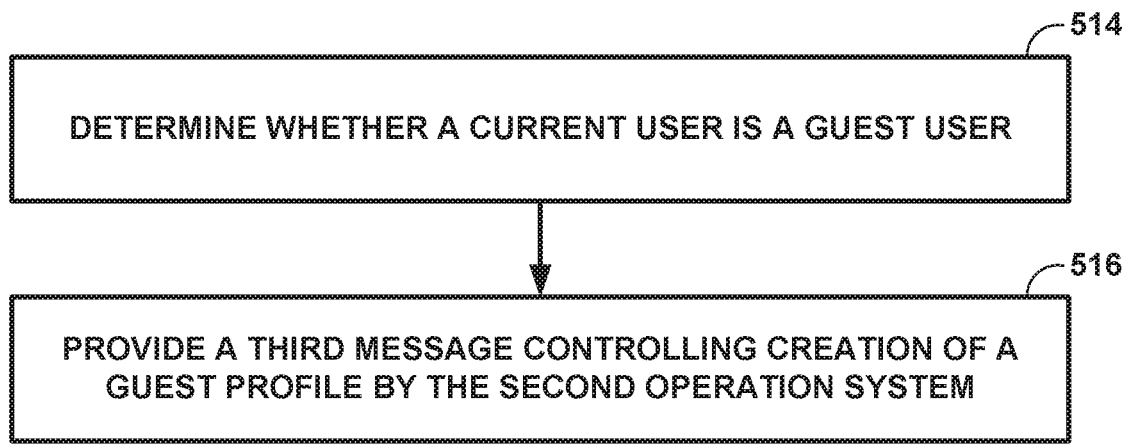
Figure 14C:
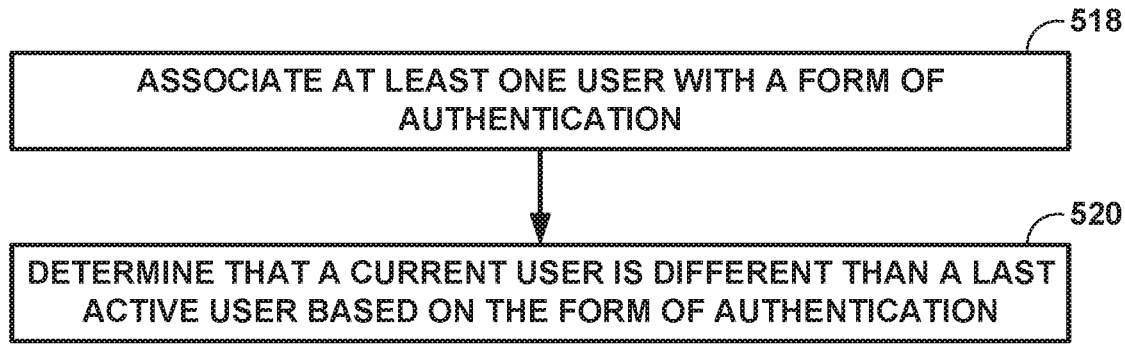

FIGS. 14A-C are flowcharts of further examples of providing user management services according to the techniques of this disclosure. Any or all of the examples of FIGS. 14A-C may be used together with the example of FIG. 13.

In FIG. 14A, the first operating system may determine whether a change in users is permitted at a time based on the second message (510). For example, first OS 30 may read the second message and determine a change in users is permitted (e.g., a change in users is not prohibited by second OS 31). Based on the determination that the change in users is permitted at the time, the interface may provide a third message to the second operating system, the third message controlling one or more systems of the vehicle. For example, API 29 may provide a third message to second OS 31 (e.g., HAL 28). The third message may control one of more systems of the vehicle, such as an ergonomic system, an entertainment system, an infotainment system, a climate system, a safety system or a drive mode system.

In FIG. 14B, the first operating system may determine whether a current user is a guest user based on the second message. For example, first OS 30 may read the second message and determine the current user is a guest user. Based on the determination that the current user is a guest user, the interface may provide a third message to the second operating system, the third message controlling creation of a guest user profile by the second operating system. For example, API 29 may provide a third message to second OS 31 (e.g., HAL 28). The third message may control creation of a guest user profile associated with the current user. This guest user profile may be stored in user management 35, for example.

In FIG. 14C, the first operating system may associate a user with a form of authentication (518). For example, the first OS 30 may associate one or more of a key fob, a finger print, a face (through a facial scan or image) or a voice (through a voiceprint) with the user. The first operating system may determine that a current user is different than a last active user based on the form of authentication (520). For example, first OS 30 may look up the authentication factor(s) for the current user (which may be stored in user management 35 or in a vehicle authentication system which may be one of vehicle systems 26A-26N) and determine the current user is not the last active user. In this case, first OS 30 may attempt to change users to the current user, create a new user, create a guest user, etc.

Figure 15:
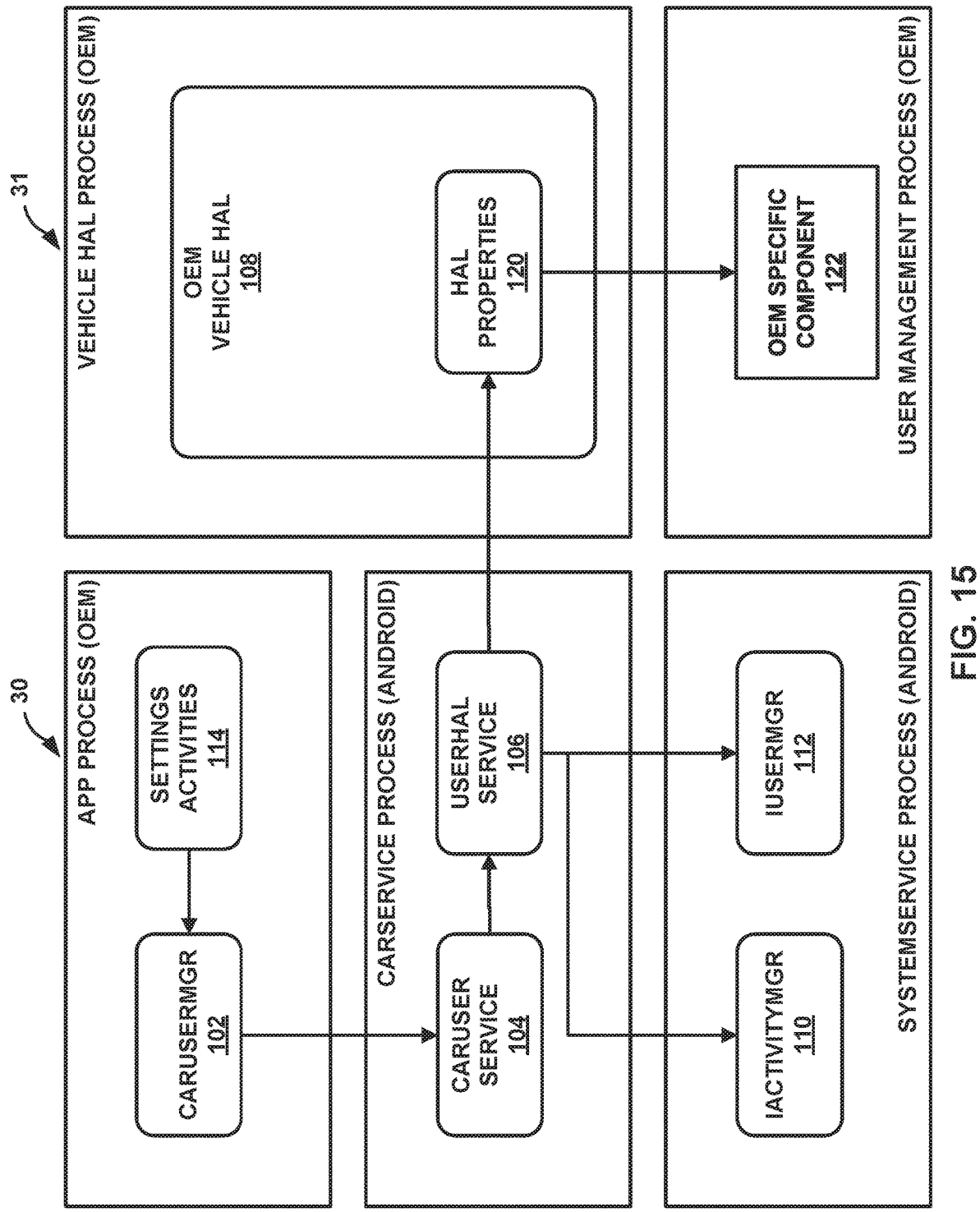
FIG. 15 is a block diagram illustrating an example of components of a first operating system and a second operating system.

FIG. 15 is a block diagram illustrating example components of first OS 30 and second OS 31. First OS 30 may include settings activities 114, such as settings that may be associated with a user (which may be associated with a vehicle manufacturer) and CarUserManager application 102 (CARUSERMGR) (which may be a software development kit associated with a vehicle manufacturer). First OS 30 may also include CarUserService 104, UserHalService 106, IActivityManager 110 and IUserManager 112. Second OS 31 may include VehicleHAL 108 and OEM specific component 122, which may be utilized by second OS 31 for user management. VehicleHAL 108 may include HAL properties 120, discussed further below.

In some examples, first OS 30 may send a message though API 29 to HAL 28 when first OS 30 starts to request HAL 28 to communicate which type of user should be used (e.g., initial user, guest user, regular user, etc.). This message may be sent on different types of start, such as a first boot (e.g., the first time the car is started), a cold boot (e.g., a normal boot after the first boot) or a suspend to RAM (e.g., a wake from sleep). HAL 28 may respond to API 29 with a type of user to be used by first OS 30. In some examples, during a first boot, a cold boot or a suspend from RAM, first OS 30 may call HAL 28. HAL 28 may respond with switching to an existing user, creating a user or a mixture of the two.

In some examples, a callback event may be enabled. For example, first OS 30 may send a notification to an application (which may be provided by a vehicle manufacturer) that may run on first OS 30 when a user is unlocked or switched.

When first OS 30 boots up, first OS 30 may use CarServiceHelperService to determine which user to switch to. For example, on the first boot, OS 30 may create the initial user (e.g., user 10). On other boots or suspends to RAM, OS 30 may switch the user to the last active user. In other examples, OS 30 may switch the user to a user that is associated with the FOB that unlocked the car or is associated with another authentication factor.

While the examples discussed herein focus on UI 100 initiating various workflows, in some examples, HAL 28 may initiate workflows. For example, when a vehicle face recognition system (e.g., one of vehicle systems 26) detects a different user than the last user, HAL 28 may send a message to API 29 to initiate a user switch.

In some examples, OS 30 may interact with HAL 28 in other manners. In an example, user switching, creation, and removal may be abstracted into interfaces as set forth in the computer program listing appendix, which is hereby incorporated by reference as if set forth in its entirety.

UserManagerService and ActivityManagerService may optionally use these interfaces, as shown in the appendix.

Techniques may be added to the underlying internal services to integrate the techniques of this disclosure with existing user management APIs from first OS 30. For example, CarServiceHelperServer may be changed as provided in the attached computer program listing appendix.

In some examples, UserManager may provide APIs that may be called to check if a user can be switched.

In some examples, HAL 28 messages include information about the current user status (e.g., current user identification, list of all users, etc.). In some examples, HAL 28 may utilize the information about the current user status to keep the user state of HAL 28 in sync with the user state of first OS 30. In some examples, first OS 30 callbacks may include the information about the current user status as well.

In some examples, CarUserService 104 may guarantee that there is only one operation running at any time. For example, if a switch user request is attempted before a previous request is completed, CarUserService 104 may fail the new switch user request.

In some examples, HAL 28 responses to API 29 messages may be synchronous. In such cases, the techniques of this disclosure may be simpler to implement. For example, a caller from an application may issue a one way binder transaction, so UserHalService 106 can block until HAL 28 responds. However, this may result in many blocked threads if HAL 28 is unresponsive.

In other examples, HAL 28 responses to API 29 may be asynchronous. In such examples, state machines may be used to map requests to the responses and UserHalService may be more lightweight.

101061 An example implementation of VehicleHAL 108 is provided in the attached computer program listing appendix.

In some examples, certain user-related settings defined by framework configuration properties may be within HAL 28. In such cases, the advantages of having the property value available immediately to HAL 28 (before parsing of overlaid resources) and of HAL 28 being able to dynamically change the values (e.g., define a maximum number of users based on current storage capacity in system memory 16.

In these cases, the initial settings may be passed to a UserController. In some examples, the initial settings are passed to UserController on ActivityManagerService.retrieveSettings( ), which is called from ActivityManagerService.systemReady( ) before CarServiceHelperService is instantiated. An example technique to achieve passing the initial settings to UserController would be causing the goingCallback used by ActivityManagerService.systemReady( ) to return the settings. An example implementation is shown in the appendix.

Then CarServiceHelperService may implement that interface by reading the values from VehicleHAL 108, as shown in the computer program listing appendix.

Another example technique is for ActivityManagerService to set the initial values, then allow CarServiceHelper to override the initial values when CarServiceHelper starts by calling a new method on ActivityManagerInternal, as shown in the computer program listing appendix.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

This disclosure includes many examples. These examples include the following.

Example 1. A method comprising: executing, by one or more processors of a vehicle, a first operating system to provide user management services to the vehicle; presenting, by the first operating system executed by the one or more processors, an interface to a second operating system by which the second operating system invokes user management operations; generating, by the first operating system executed by the one or more processors, a first message relating to user management; providing, by the interface, the first message to the second operating system; and receiving, by the interface, a second message from the second operating system, the second message being related to synchronizing user management between the first operating system and the second operating system.

Example 2. The method of example 1, wherein the first message comprises a request to change users.

Example 3. The method of example 2, further comprising: determining, by the first operating system executed by the one or more processors, whether a change in users is permitted at a time based on the second message; and based on the determination that the change in users is permitted at the time, providing, by the interface, a third message to the second operating system, the third message controlling one or more systems of the vehicle.

Example 4. The method of example 3, wherein the third message further comprises preferences of a current user of operational states of the one or more systems of the vehicle.

Example 5. The method of example 1, wherein the first message comprises a user create message.

Example 6. The method of example 5, wherein the first message further comprises a new user profile message.

Example 7. The method of example 6, wherein the second message is indicative of an internal user profile being stored by the second operating system in a vehicle user management system, the internal user profile being based on the new user profile.

Example 8. The method of example 1, wherein the first message comprises a user delete message.

Example 9. The method of example 8, wherein the second message is indicative of a user being deleted from a vehicle user management system.

Example 10. The method of example 9, wherein the second message is further indicative of a determination, by the second operating system executed by the one or more processors, that the user is not a current user.

Example 11. The method of example 1, wherein the first message comprises an initial user assignment message.

Example 12. The method of example 11, wherein the first message further comprises an initial user profile.

Example 13. The method of example 12, further comprising receiving, by the interface, a third message from the second operating system executed by the one or more processors, the third message being indicative of no user being stored in a vehicle user management system, wherein the second message is indicative of an internal user profile being stored, by the second operating system executed on the one or more processors, based on the initial user profile.

Example 14. The method of example 1, wherein the first message comprises a guest user message.

Example 15. The method of example 14, further comprising: determining, by the first operating system executed on the one or more processors, whether a current user is a guest user based on the second message; and based on the determination that the current user is a guest user, providing, by the interface, a third message to the second operating system executed by the one or more processors, the third message controlling creation of a guest user profile by the second operating system executed by the one or more processors in a vehicle user management system.

Example 16. The method of any combination of examples 1-15, further comprising, associating, by the first operating system executed by the one or more processors, a user with a form of authentication.

Example 17. The method of example 16, wherein the form of authentication comprises one or more of a key fob, a fingerprint, a face or a voice.

Example 18. The method of any combinations of examples 1-17, further comprising determining, by the first operating system executed by the one or more processors, that a current user is different from a last active user.

Example 19. The method of example 18, wherein the determining that the current user is different from the last active user comprises determining a current key fob, fingerprint, face, or voice is not associated with the last active user.

Example 20. The method of any combination of examples 1-19, wherein the one or more systems of the vehicle comprise an ergonomic system, an infotainment system, a climate system, a safety system or a drive mode system.

Example 21. The method of any combination of examples 1-20, wherein the interface provides messages to a vehicle hardware abstraction layer of the second operating system executed by the one or more processors and receives messages from the vehicle hardware abstraction layer.

Example 22. The method of any combination of examples 1-21, wherein the one or more processors execute the second operating system.

Example 23. A device configured in interact with a vehicle, the device comprising: a memory configured to store user management data; and one or more processors communicatively coupled to the memory and configured to: execute a first operating system, the first operating system presenting an interface to a second operating system to invoke user management operations; wherein the first operating system is configured to generate a first message relating to user management, the interface is configured to provide the message to the second operating system and the interface is further configured to receive a second message from the second operating system, the second message being related to synchronizing user management between the first operating system and the second operating system, and wherein the first operating system provides user management services to the vehicle based on the first message.

Example 24. The device of example 23, wherein the first message comprises a request to change users.

Example 25. The device of example 24, wherein the first operating system is further configured to determine whether a change in users is permitted at a time based on the second message and the interface is further configured to provide a third message to the second operating system, the third message controlling one or more systems of the vehicle based on the determination that the change in users is permitted at the time.

Example 26. The device of example 25, wherein the third message further comprises preferences of a current user of operational states of the one or more systems of the vehicle.

Example 27. The device of example 23, wherein the first message comprises a user create message.

Example 28. The device of example 27, wherein the first message further comprises a new user profile message.

Example 29. The device of example 28, wherein the second message is indicative of an internal user profile being stored by the second operating system in a vehicle user management system, the internal user profile being based on the new user profile.

Example 30. The device of example 23, wherein the first message comprises a user delete message.

Example 31. The device of example 30, wherein the second message is indicative of a user being deleted from a vehicle user management system.

Example 32. The device of example 31, wherein the second message is further indicative of a determination, by the second operating system executed by the one or more processors, that the user is not a current user.

Example 33. The device of example 23, wherein the first message comprises an initial user assignment message.

Example 34. The device of example 33, wherein the first message further comprises an initial user profile.

Example 35. The device of example 34, wherein the interface is further configured to receive a third message from the second operating system, the third message being indicative of no user being stored in a vehicle user management system, wherein the second message is indicative of an internal user profile being stored in a vehicle user management system.

Example 36. The device of example 23, wherein the first message comprises a guest user message.

Example 37. The device of example 36, wherein the first operating system is further configured to determine whether a current user is a guest user based on the second message and the interface is further configured to provide a third message to the second operating system, the third message controlling creation of a guest user profile by the second operating system based on the determination that the current user is a guest user.

Example 38. The device of any combination of examples 23-37, wherein the first operating system is further configured to associate a user with a form of authentication.

Example 39. The device of example 38, wherein the form of authentication comprises one or more of a key fob, a fingerprint, a face or a voice.

Example 40. The device of any combinations of examples 23-39, wherein the first operating system is further configured to determine that a current user is different from a last active user.

Example 41. The device of example 40, wherein the first operating system determines that the current user is different from the last active user by determining a current key fob, fingerprint, face, or voice is not associated with the last active user.

Example 42. The device of any combination of examples 23-41, wherein the one or more systems of the vehicle comprise an ergonomic system, an infotainment system, a climate system, a safety system or a drive mode system.

Example 43. The device of any combination of examples 23-42, wherein the interface is configured to provide messages to a vehicle hardware abstraction layer of the second operating system and receives messages from the vehicle hardware abstraction layer.

Example 44. The device of any combination of examples 23-43, wherein the one or more processors are further configured to execute the second operating system.

Example 45. A non-transitory computer-readable storage medium having stored thereon instructions that, when executed, cause one or more processors of a vehicle head unit to: execute a first operating system to provide user management services to the vehicle; present an interface of the first operating system to a second operating system by which the second operating system invokes user management operations; generate a first message relating to user management; provide, by the interface, the first message to the second operating system; and receive, by the interface, a second message from the second operating system, the second message being related to synchronizing user management between the first operating system and the second operating system.

Example 46. The non-transitory computer-readable storage medium of example 45, wherein the first message comprises a request to change users.

Example 47. The non-transitory computer-readable storage medium of example 46, wherein the instructions, when executed further cause the one or more processors to: determine whether a change in users is permitted at a time based on the second message; and based on the determination that the change in users is permitted at the time, provide, by the interface, a third message to the second operating system, the third message controlling one or more systems of the vehicle.

Example 48. The non-transitory computer-readable storage medium of example 47, wherein the third message further comprises preferences of a current user of operational states of the one or more systems of the vehicle.

Example 49. The non-transitory computer-readable storage medium of example 45, wherein the first message comprises a user creation message.

Example 50. The non-transitory computer-readable storage medium of example 49, wherein the first message further comprises a new user profile message.

Example 51. The non-transitory computer-readable storage medium of example 50, wherein the second message is indicative of an internal user profile being stored by the second operating system in a vehicle user management system, the internal user profile being based on the new user profile.

Example 52. The non-transitory computer-readable storage medium of example 45, wherein the first message comprises a user delete message.

Example 53. The non-transitory computer-readable storage medium of example 52, wherein the second message is indicative of a user being deleted from a vehicle user management system.

Example 54. The non-transitory computer-readable storage medium of example 53, wherein the second message is further indicative of a determination, by the second operating system executed by the one or more processors, that the user is not a current user.

Example 55. The non-transitory computer-readable storage medium of example 45, wherein the first message comprises an initial user assignment message.

Example 56. The non-transitory computer-readable storage medium of example 55, wherein the first message further comprises an initial user profile.

Example 57. The non-transitory computer-readable storage medium of example 56, wherein the instructions, when executed further cause the one or more processors to: receive, by the interface, a third message from the second operating system, the third message being indicative of no user being stored in a vehicle user management system, wherein the second message is indicative of an internal user profile being stored, by the second operating system, based on the initial user profile.

Example 58. The non-transitory computer-readable storage medium of example 45, wherein the first message comprises a guest user message.

Example 59. The non-transitory computer-readable storage medium of example 58, wherein the instructions, when executed further cause the one or more processors to: determine, by the first operating system, whether a current user is a guest user based on the second message; and provide, by the interface, a third message to the second operating system, the third message controlling creation of a guest user profile by the second operating system in a vehicle user management system.

Example 60. The non-transitory computer-readable storage medium of any combination of examples 45-59, wherein the instructions, when executed further cause the one or more processors to: associate, by the first operating system, a user with a form of authentication.

Example 61. The non-transitory computer-readable storage medium of example 60, wherein the form of authentication comprises one or more of a key fob, a fingerprint, a face or a voice.

Example 62. The non-transitory computer-readable storage medium of any combinations of examples 45-61, wherein the instructions, when executed further cause the one or more processors to: determine, by the first operating system executed by the one or more processors, that a current user is different from a last active user.

Example 63. The non-transitory computer-readable storage medium of example 62, wherein the first operating system determines that the current user is different from the last user by determining a current key fob, fingerprint, face, or voice is not associated with the last active user.

Example 64. The non-transitory computer-readable storage medium of any combination of examples 45-63, wherein the one or more systems of the vehicle comprise an ergonomic system, an infotainment system, a climate system, a safety system or a drive mode system.

Example 65. The non-transitory computer-readable storage medium of any combination of examples 45-64, wherein the interface is configured to provide messages to a vehicle hardware abstraction layer of the second operating system and receives messages from the vehicle hardware abstraction layer.

Example 66. The non-transitory computer-readable storage medium of any combination of examples 45-65, wherein the instructions, when executed further cause the one or more processors to execute the second operating system.

Various embodiments have been described. These and other embodiments are within the scope of the following claims.

What is claimed is:

1. A method comprising:
executing, by one or more processors of a vehicle, a first operating system to provide user management services to the vehicle, and a second operating system;
presenting, by the first operating system executed by the one or more processors, an interface to the second operating system by which the second operating system invokes user management operations;
generating, by the first operating system executed by the one or more processors, a first message relating to user management;
providing, by the interface, the first message to the second operating system;
receiving, by the interface, a second message from the second operating system, the second message being related to synchronizing user management between the first operating system and the second operating system;
determining, by the first operating system executed by the one or more processors, whether a change in users is permitted at a time based on the second message; and
based on the determination that the change in users is permitted at the time, providing, by the interface, a third message to the second operating system, the third message controlling one or more systems of the vehicle.

2. The method of claim 1, wherein the first message comprises a request to change users.

3. The method of claim 2, further comprising receiving, by the interface, a fourth message comprising at least one of a user create message or an initial user assignment message and the fourth message further comprises at least one of a new user profile or an initial user profile.

4. The method of claim 1, wherein the second message is indicative of at least one of whether the change in users is permitted at the time.

5. The method of claim 1, wherein the one or more systems of the vehicle comprise at least one of an ergonomic system, an entertainment system, an infotainment system, a climate system, a safety system or a drive mode system.

6. The method of claim 1, further comprising receiving, by the interface, a forth message from the second operating system, the fourth message being indicative of no user being stored in a vehicle user management system.

7. The method of claim 1, further comprising:
associating, by the first operating system executed by the one or more processors, a user with a form of authentication; and
determining, by the first operating system executed by the one or more processors, that a current user is different than a last active user based on the form of authentication,
wherein the form of authentication comprises one or more of a key fob, a fingerprint, a face or a voice.

8. The method of claim 1, wherein the interface provides messages to a vehicle hardware abstraction layer of the second operating system and receives messages from the vehicle hardware abstraction layer.

9. The method of claim 1, further comprising receiving, by the interface, a fourth message from the second operating system, the fourth message being related to synchronizing user management between the first operating system and the second operating system.

10. The method of claim 9, further comprising:
determining, by the first operating system executed on the one or more processors, whether a current user is a guest user based on the fourth message; and
based on the determination that the current user is a guest user, providing, by the interface, a fifth message to the second operating system, the fourth message controlling creation of a guest user profile by the second operating system.

11. A device configured in interact with a vehicle, the device comprising:
one or more processors; and
a memory configured to store user management data and instructions, that when executed, cause; the one or more processors communicatively coupled to the memory to:
execute a first operating system, the first operating system and a second operating system, the first operating system presenting an interface to the second operating system to invoke user management operations;
wherein the first operating system is configured to generate a first message relating to user management, the interface is configured to provide the message to the second operating system and the interface is further configured to receive a second message from the second operating system, the second message being related to synchronizing user management between the first operating system and the second operating system,
wherein the first operating system is further configured to determine whether a change in users is permitted at a time based on the second message and wherein the interface is further configured to provide a third message to the second operating system, the third message controlling one or more systems of the vehicle based on the determination that the change in users is permitted at the time, and
wherein the first operating system provides user management services to the vehicle based on the first message.

12. The device of claim 11, wherein the first message comprises a request to change users.

13. The device of claim 12,
wherein the first operating system is configured to generate a fourth message comprising at least one of a user create message or an initial user assignment message, and
wherein the fourth message further comprises at least one of a new user profile or an initial user profile.

14. The device of claim 11, wherein the second message is indicative of at least one of whether a change in users is permitted at a time.

15. The device of claim 11, wherein the one or more systems of the vehicle comprise at least one of an ergonomic system, an entertainment system, an infotainment system, a climate system, a safety system or a drive mode system.

16. The device of claim 11, wherein the interface is further configured to receive a fourth message from the second operating system, the fourth message being indicative of no user being stored in a vehicle user management system.

17. The device of claim 11, wherein the first operating system is further configured to:
associate a user with a form of authentication;
determine that a current user is different from a last active user based upon the form of authentication,
wherein the form of authentication comprises one or more of a key fob, a fingerprint, a face or a voice.

18. The device of claim 11, wherein the first operating system is further configured to receive a fourth message from the second operating system, the fourth message being related to synchronizing user management between the first operating system and the second operating system.

19. The device of claim 18, wherein the first operating system is further configured to determine whether a current user is a guest user based on the fourth message and the interface is further configured to provide a fifth message to the second operating system, the fifth message controlling creation of a guest user profile by the second operating system based on the determination that the current user is a guest user.

20. A non-transitory computer-readable storage medium having stored thereon instructions that, when executed, cause one or more processors of a vehicle head unit to:
execute a first operating system to provide user management services to the vehicle, and a second operating system;
present an interface of the first operating system to the second operating system by which the second operating system invokes user management operations;
generate a first message relating to user management;
provide, by the interface, the first message to the second operating system;
receive, by the interface, a second message from the second operating system, the second message being related to synchronizing user management between the first operating system and the second operating system;
determine, by the first operating system executed by the one or more processors, whether a change in users is permitted at a time based on the second message; and
based on the determination that the change in users is permitted at the time, provide, by the interface, a third message to the second operating system, the third message controlling one or more systems of the vehicle.

* * * * *